(12) United States Patent
Kakizaki

(10) Patent No.: US 12,123,625 B2
(45) Date of Patent: Oct. 22, 2024

(54) WATER HEATER

(71) Applicant: Paloma Rheem Holdings, Nagoya (JP)

(72) Inventor: Yusuke Kakizaki, Aichi (JP)

(73) Assignee: Paloma Rheem Holdings, Nagoya (JP)

( * ) Notice: Subject to any disclaimer, the term of this patent is extended or adjusted under 35 U.S.C. 154(b) by 58 days.

(21) Appl. No.: 18/070,832

(22) Filed: Nov. 29, 2022

(65) Prior Publication Data

US 2023/0175733 A1     Jun. 8, 2023

(30) Foreign Application Priority Data

Dec. 8, 2021  (JP) ................. 2021-199277

(51) Int. Cl.
| | | |
|---|---|---|
| *F24H 9/00* | (2022.01) | |
| *F24H 1/14* | (2022.01) | |
| *F24H 9/14* | (2006.01) | |

(52) U.S. Cl.
CPC .............. *F24H 9/146* (2013.01); *F24H 1/14* (2013.01); *F24H 9/001* (2013.01)

(58) Field of Classification Search
CPC . F24H 9/146; F24H 9/001; F24H 1/14; F24H 9/148; F24H 9/00; F24H 2210/00; F24H 1/208; F24H 8/00
See application file for complete search history.

(56) References Cited

U.S. PATENT DOCUMENTS 11,226,134 B2 *   1/2022   Kawada ................. F28F 9/001

FOREIGN PATENT DOCUMENTS

| JP | 2020165638 A | | 10/2020 |
|---|---|---|---|
| JP | 2021055888 A | * | 4/2021 |
| JP | 2023017167 A | * | 2/2023 |
| JP | 2023062317 A | * | 5/2023 |
| JP | 2023062321 A | * | 5/2023 |

* cited by examiner

*Primary Examiner* — Gregory A Wilson
(74) *Attorney, Agent, or Firm* — Maier & Maier, PLLC

(57) ABSTRACT

A water heater includes a primary heat exchanger, a secondary heat exchanger disposed above the primary heat exchanger, a flow path member, and a flow restriction member. The secondary heat exchanger includes a case and heat transfer pipes arranged in the case. The case includes a wall having a gas inlet through which combustion exhaust gas discharged from the primary heat exchanger is introduced into the case. The flow path member connects the primary heat exchanger and the secondary heat exchanger and is disposed adjacent to the gas inlet and is configured to introduce the combustion exhaust gas discharged from the primary heat exchanger into the secondary heat exchanger through the gas inlet. The flow restriction member is disposed on the wall of the case to suppress upward flowing of the combustion exhaust gas that is introduced into the case through the gas inlet.

4 Claims, 18 Drawing Sheets

WATER HEATER

CROSS REFERENCE TO RELATED APPLICATION

This application claims priority from Japanese Patent Application No. 2021-199277 filed on Dec. 8, 2021. The entire contents of the priority application are incorporated herein by reference.

TECHNICAL FIELD

The technology described herein relates to a water heater.

BACKGROUND

A latent heat recovery type heat exchanger has been known. Such a heat exchanger includes a primary heat exchanger for recovering sensible heat, a secondary heat exchanger for recovering latent heat, and a flow path member that connects the heat exchangers. A secondary heat exchanger described in Japanese Unexamined Patent Application Publication No. 2020-165638 includes a case and heat transfer pipes arranged in the case. Water flows through the heat transfer pipes. The case includes an inlet in a rear wall of the case and an outlet in a front wall thereof. Combustion exhaust gas flows into the case through the inlet and is discharged through the outlet. The heat transfer pipe includes six straight pipe portions that extend in a right-left direction and five bent portions that connect ends of the adjacent straight pipe portions. The heat transfer pipes are arranged to overlap each other with respect to an upper-bottom direction inside the case. The straight pipe portions are arranged at intervals with respect to the upper-bottom direction and a front-rear direction. A lower end of the flow path member is fixed to an upper edge portion of the primary heat exchanger and an upper end of the flow path member is fixed to a peripheral portion of the inlet of the secondary heat exchanger. With such a water heater, after sensible heat is recovered from combustion exhaust gas by the primary heat exchanger, the combustion exhaust gas moves upward inside the flow path member and enters the secondary heat exchanger from a rear side. Heat energy of the combustion exhaust gas that enters the second heat exchanger is transmitted to the water that flows through the straight pipes while passing by the straight pipes and the water is heated.

In the above configuration, the combustion exhaust gas flows upward inside the flow path member and flows into the secondary heat exchanger. The combustion exhaust gas flowing into the secondary heat exchanger will further flow upward. Furthermore, the combustion exhaust gas has a quite high temperature of about 200° C. Therefore, the combustion exhaust gas flowing into the secondary heat exchanger tends to flow toward an upper section of the case. The combustion exhaust gas is less likely to be dispersed in the vicinity of the inlet and a great amount of the combustion exhaust gas flows to the vicinity of the straight pipes that are arranged in the upper section of the case. Therefore, heat may not be effective transmitted to the straight pipes that are arranged in lower section of the case.

SUMMARY

The technology described herein was made in view of the above circumstances. An object is to improve thermal efficiency of a secondary heat exchanger of a water heater.

A heat exchanger according to one aspect of the present disclosure includes a primary heat exchanger, a secondary heat exchanger disposed above the primary heat exchanger, a flow path member, and a flow restriction member. The secondary heat exchanger includes a case including a wall having a gas inlet through which combustion exhaust gas discharged from the primary heat exchanger introduced into the case and heat transfer pipes that are arranged in the case. The flow path member connects the primary heat exchanger and the secondary heat exchanger and is disposed adjacent to the gas inlet. The flow path member is configured to introduce the combustion exhaust gas discharged from the primary heat exchanger into the secondary heat exchanger through the gas inlet. The flow restriction member is disposed on the wall of the case to suppress upward flowing of the combustion exhaust gas that is introduced into the case through the gas inlet.

According to such a configuration, the combustion exhaust gas that is introduced into the case of the secondary heat exchanger through the gas inlet is guided by the flow restriction member not to flow upward. Thereafter, the combustion exhaust gas flows frontward with being dispersed in a range extending in the upper-bottom direction. Accordingly, the combustion exhaust gas can flow to the heat transfer pipes that are disposed adjacent to the gas inlet and in the lower section of the case. Therefore, heat energy of combustion exhaust gas can be transferred to the water flowing in the heat transfer pipes efficiently and thermal efficiency can be improved.

The flow restriction member may be a guide plate that is integrally included in the case and extends from an upper hole edge of the gas inlet and is inclined downward as it extends toward an inside of the case.

According to such a configuration, with the guide plate being included integrally with the case, the thermal efficiency can be improved without increasing the number of components.

The heat transfer pipes may be disposed on top of each other in a first direction in the case. The heat transfer pipes may include straight pipe portions that extend in a second direction that is perpendicular to the first direction and are arranged at intervals with respect to the first direction and a third direction that is perpendicular to the first direction and the second direction. The guide plate may be inclined such that an imaginary plane surface extending from the guide plate crosses one of the straight pipe portions that is disposed closest to the gas inlet with respect to the third direction and lower than a middle of the straight pipe portions with respect to the first direction.

According to such a configuration, the combustion exhaust gas that is introduced into the secondary heat exchanger is guided downward by the guide plate and flows frontward with changing its flowing direction to upward by the rising tendency of the combustion exhaust gas. Then, the combustion exhaust gas passes through spaces adjacent to the straight pipe portions that are disposed at the rearmost and middle position with respect to the upper-bottom direction in the case. Then, the combustion exhaust gas flows frontward with being dispersed in a large space ranging in the upper-bottom direction and transfers heat to the straight pipe portions. Thus, the combustion gas contacts with a greater number of heat transfer tubes and efficient heat recovery can be performed. This improves thermal efficiency.

The flow path member may include a recess portion having an opening that opens toward the gas inlet. The flow path member may be mounted on the wall to cover the gas inlet and the opening of the flow path member and the gas inlet may be communicated with each other. The flow path member and the wall may define an inner space between the flow path member and the wall and the combustion exhaust gas flows in the inner space.

An upper hole edge of the opening and an upper hole edge of the gas inlet may be at a same level. An upper wall of the flow path member may extend to be inclined downward from the upper hole edge of the opening.

According to such a configuration, drift of the combustion exhaust gas is less likely to occur in the inner space of the gas flow cavity defined by the flow path member. This suppresses increase in exhaust resistance of combustion exhaust gas.

According to the technology described herein, thermal efficiency of a secondary heat exchanger of a water heater can be improved.

DETAILED DESCRIPTION

First Embodiment

A first embodiment will be described below with reference to FIGS. 1 to 17. Regarding components having the same configuration, some of the components may be indicated by reference signs and others may not be indicated by the reference signs.

[Whole Structure of Water Heater]

Figure 1:
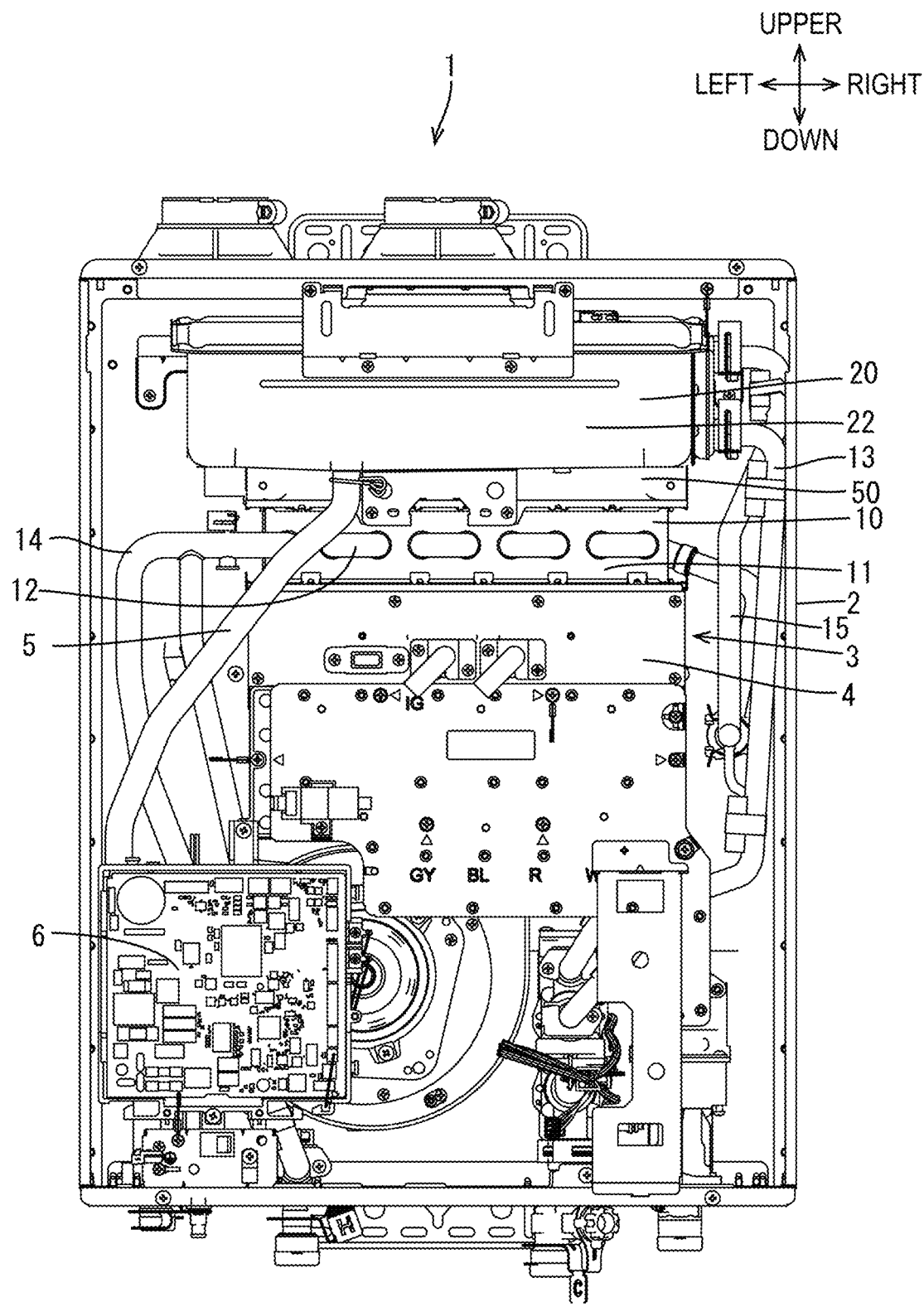
FIG. 1 is a front view of a water heater according to one embodiment with a front cover being not illustrated.
Figure 2:
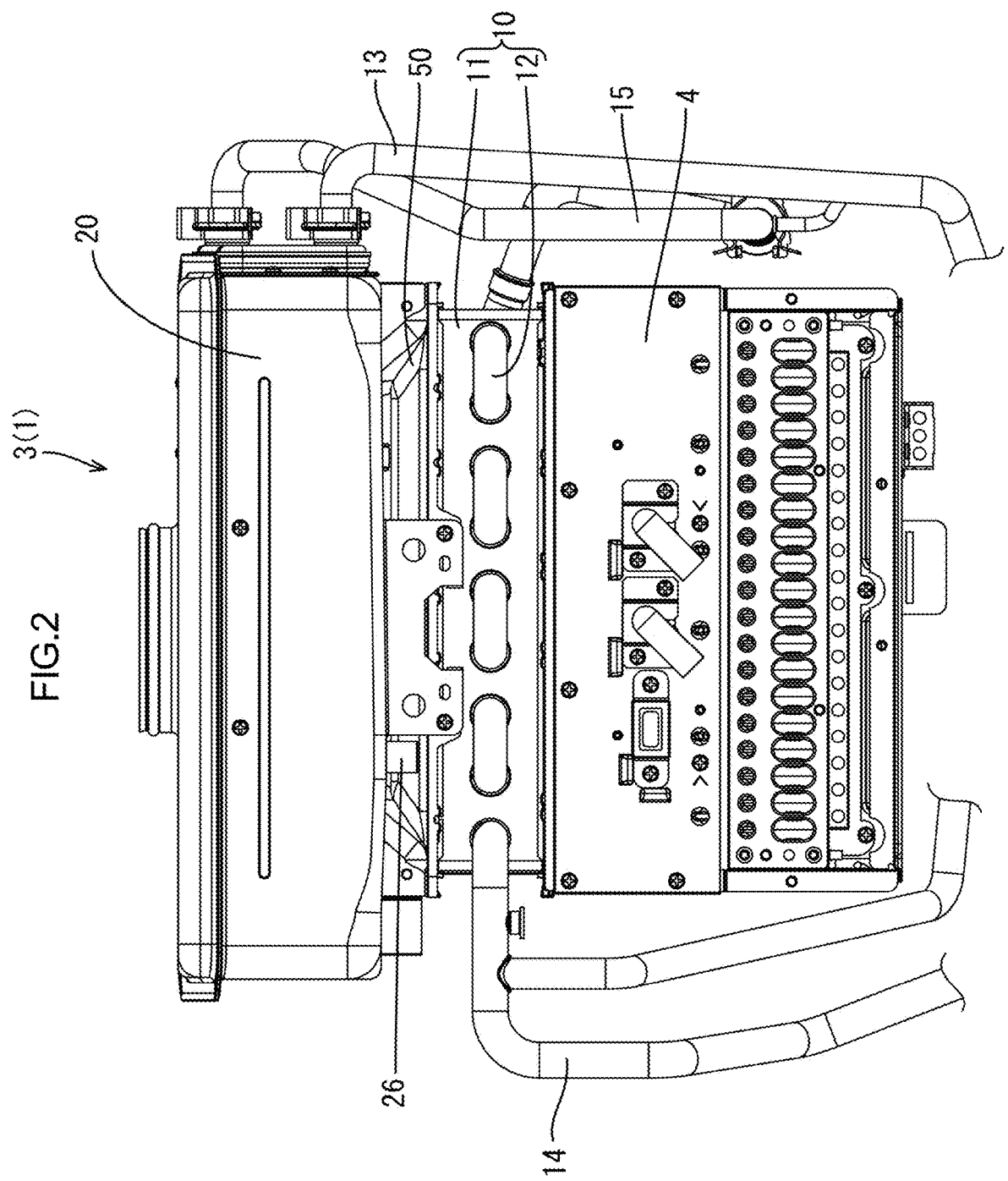
FIG. 2 is a front view of an inner body.
Figure 3:
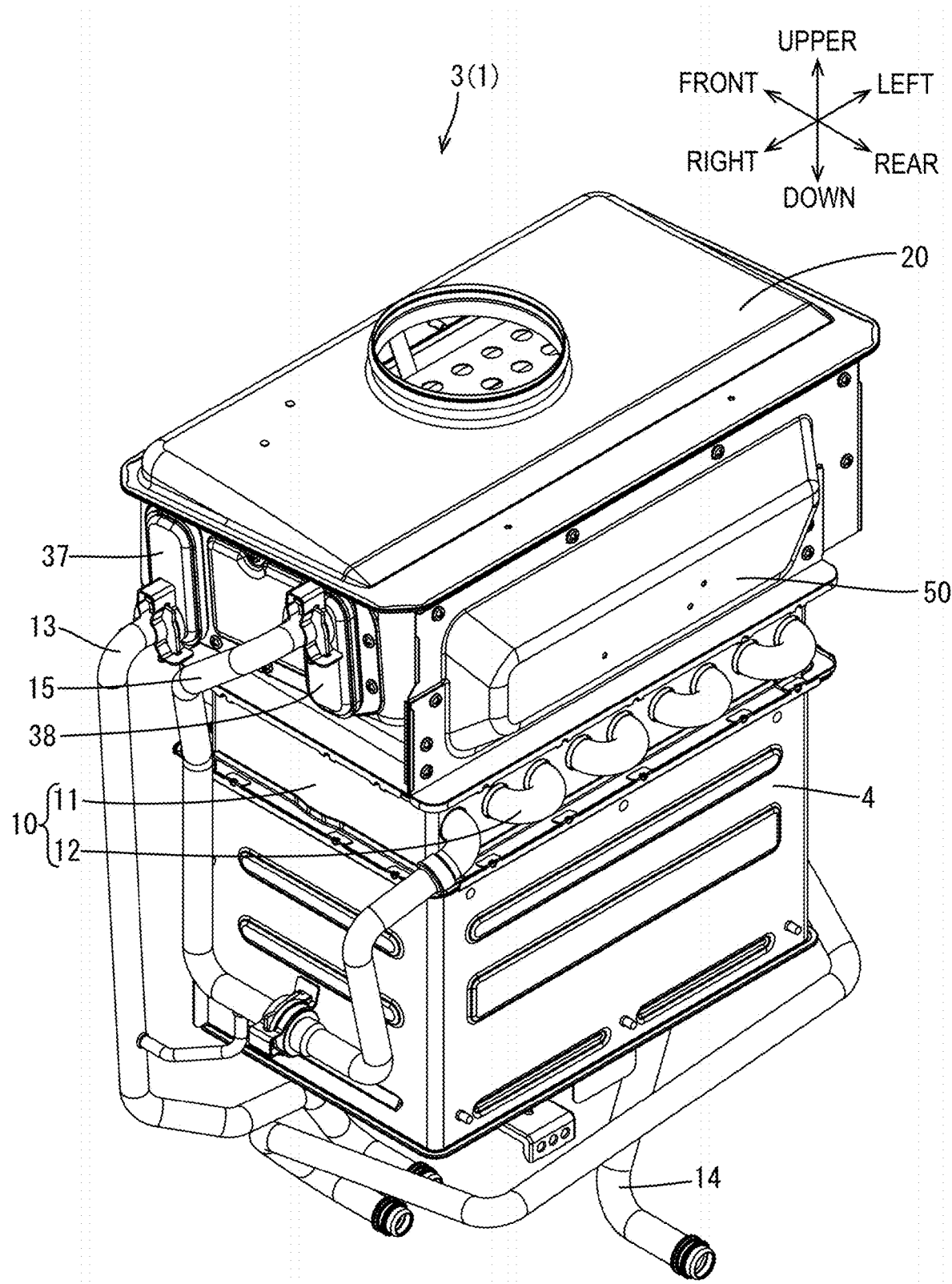
FIG. 3 is a perspective view of the inner body.

FIG. 1 is a front view of a water heater 1 and illustrates the water heater 1 with a front cover being removed. FIGS. 2 and 3 illustrate an inner body 3 that is arranged in an outer casing 2 of the water heater 1. As illustrated in FIGS. 1 to 3, the water heater 1 includes a burner 4, a primary heat exchanger 10, a secondary heat exchanger 20, a flow path member 50, a water inflow pipe 13, a hot-water outflow pipe 14, and a connection pipe 15. The water heater 1 is configured to heat tap water supplied from the outside and supply heated water. The burner 4 burns combustion gas to generate combustion exhaust gas. The combustion exhaust gas generated by the burner 4 passes through the primary heat exchanger 10 and through the flow path member 50 and flows to the secondary heat exchanger 20. Then, the combustion exhaust gas is discharged outside the water heater 1. Sensible heat of the combustion exhaust gas is recovered in the primary heat exchanger 10 and latent heat of the combustion exhaust gas is recovered in the secondary heat exchanger 20.

Figure 8:
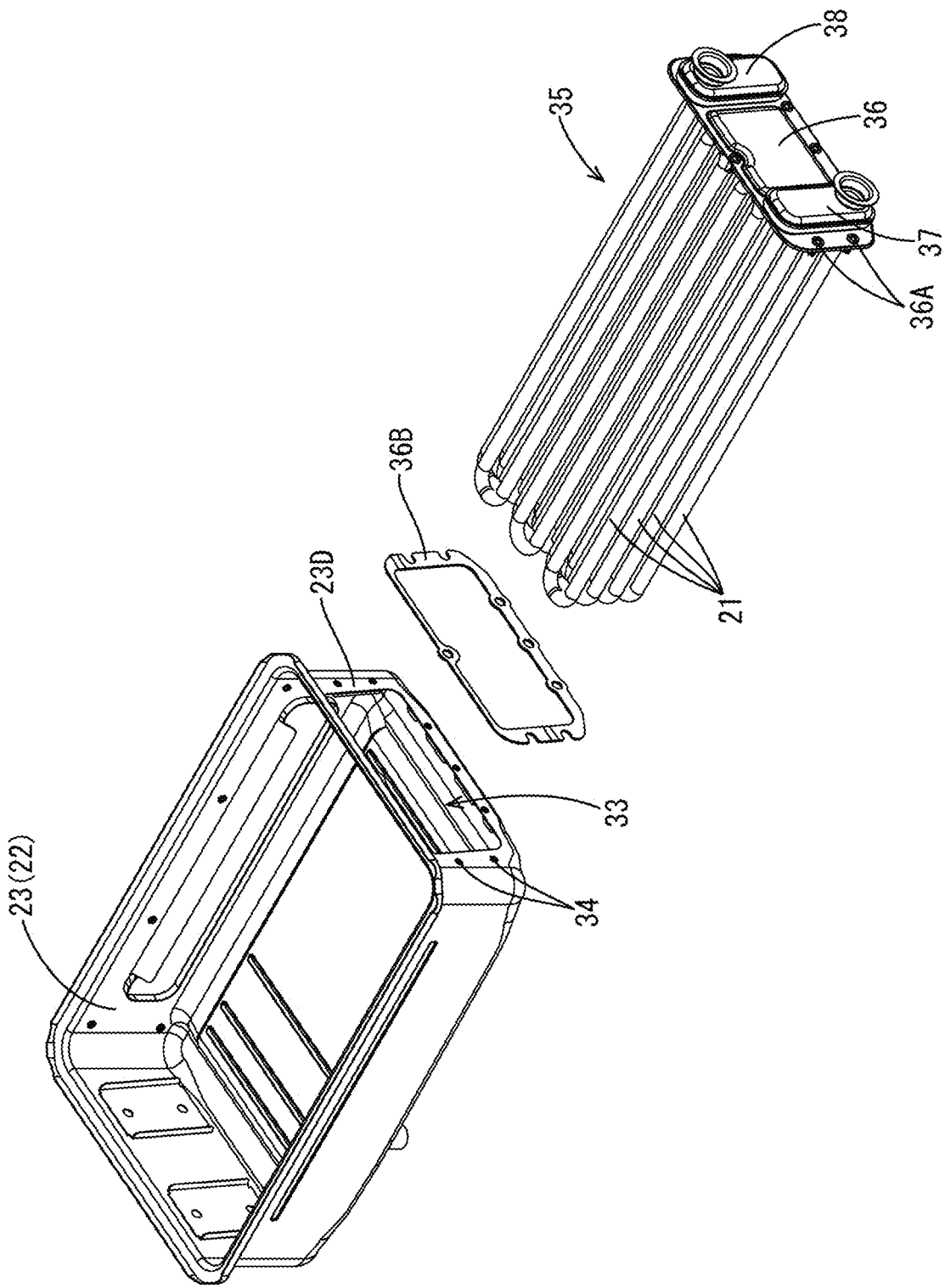
FIG. 8 is a perspective view illustrating the case body and an assembling unit that is to be fitted to the case body.
Figure 9:
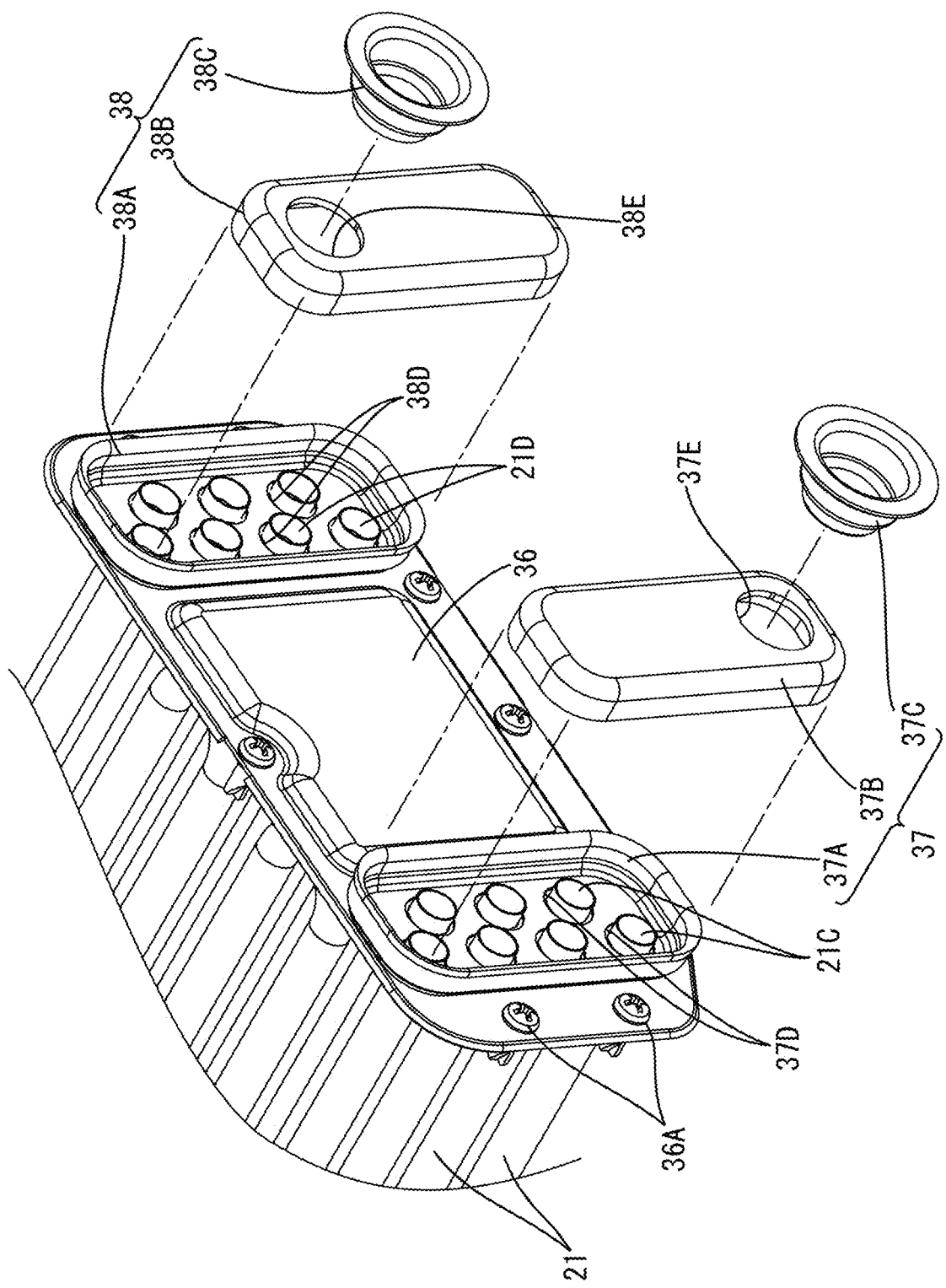
FIG. 9 is an exploded view of headers of the assembling unit.

The water inflow pipe 13 is configured as a cavity through which water is supplied and is connected to a first header 37 of the secondary heat exchanger 20 as illustrated in FIG. 3. As illustrated in FIGS. 8 and 9, the first header 37 is connected to first ends of heat transfer pipes 21 that are disposed in a case 22. Second ends of the heat transfer pipes 21 that are opposite ends from the first ends are connected to a second header 38. As illustrated in FIG. 3, the second header 38 is connected to a first end of a primary heat transfer pipe 12 that is arranged in the primary heat exchanger 10 via the connection pipe 15. As illustrated in FIGS. 1 and 2, a second end of the primary heat transfer pipe 12 that is an opposite end from the first end is connected to the hot-water outflow pipe 14. The hot-water outflow pipe 14 is configured as a cavity through which hot water is fed.

Namely, water that flows into the secondary heat exchanger 20 through the water inflow pipe 13 flows through the heat transfer pipes 21 in the secondary heat exchanger 20, the connection pipe 15, and the primary heat transfer pipe 12 of the primary heat exchanger 10 in this order. The water flowing through the heat transfer pipes 21 in the secondary heat exchanger 20 and the water flowing through the primary heat transfer pipe 12 of the primary heat exchanger 10 receives heat energy of the combustion exhaust gas and is heated. The heated water becomes hot water and flows out from the hot-water outflow pipe 14.

As illustrated in FIG. 1, the water heater 1 includes a drain hose 5. An upstream end of the drain hose 5 is connected to a drain discharge port 26 (refer to FIG. 2) of the secondary heat exchanger 20 and a downstream end of the drain hose 5 is connected to a neutralizer. Drain water generated by recovery of latent heat of the combustion exhaust gas in the secondary heat exchanger 20 is discharged outside the secondary heat exchanger 20 through the drain discharge port 26 and fed to the neutralizer via the drain hose 5.

As illustrated in FIG. 1, the water heater 1 includes a controller 6 as a control device. The controller 6 is configured as a known microcomputer and configured to receive signals from various sensors included in the water heater 1 and control various actuators included in the water heater 1. For example, if a water sensor detects water that is flowing through the water inflow pipe 13, the controller 6 of the water heater 1 operates the burner 4 to generate hot water.

[Primary Heat Exchanger]

As illustrated in FIGS. 2 and 3, the primary heat exchanger 10 includes a case 11 and the primary heat transfer pipe 12. The case 11 has a rectangular plan view shape elongated in the right-left direction and has a tubular shape that opens upward and downward. The primary heat transfer pipe 12 of the primary heat exchanger 10 is arranged in the case 11 and includes straight pipe portions and connection pipe portions. The straight pipe portions are disposed inside the case 11 and extend in the front-rear direction. The connection pipe portions are disposed outside the case 11 and connect front ends or rear ends of every two straight pipe portions that are adjacent to each other in the right-left direction. The straight pipe portions are connected to each other via the connection pipe portions and configured as one component. Namely, the primary heat transfer pipe 12 has a meandering shape as a whole. The case 11 and the primary heat transfer pipe 12 may be made of copper that has good thermal conductivity.

The primary heat exchanger 10 is disposed above the burner 4 and fixed to the burner 4. Combustion exhaust gas generated by the burner 4 flows from below to above inside the case 11 of the primary heat exchanger 10. The flow path member 50 is disposed above the primary heat exchanger 10 and fixed to the primary heat exchanger 10. After sensible heat of the combustion exhaust gas is recovered in the primary heat exchanger 10, the combustion exhaust gas is sent to the flow path member 50.

As illustrated in FIG. 3, the connection pipe 15 is connected to the primary heat transfer pipe 12 via an inlet opening of the primary heat transfer pipe 12 that is on a right section of a rear surface of the case 11. Water from the secondary heat exchanger 20 flows into the primary heat transfer pipe 12 through the inlet opening. As illustrated in FIG. 2, the hot-water outflow pipe 14 is connected to the primary heat transfer pipe 12 via an outlet opening of the primary heat transfer pipe 12 that is on a left section of a front surface of the case 11. Heated water flows out from the primary heat transfer pipe 12 through the outlet opening. Namely, in the primary heat exchanger 10, after the water flows through the connection pipe 15 and into the primary heat transfer pipe 12 from the rear surface of the case 11, the water exchanges heat with the combustion exhaust gas that passes through the case 11 by meandering inside the primary heat transfer pipe 12. The heated hot water flows into the hot-water outflow pipe 14 from the front surface of the case 11.

[Secondary Heat Exchanger]

Next, a configuration of the secondary heat exchanger 20 will be described in detail.

As illustrated in FIGS. 1 to 3, the secondary heat exchanger 20 is disposed above the primary heat exchanger 10. The secondary heat exchanger 20 and the primary heat exchanger 10 are connected by the flow path member 50. The combustion exhaust gas that passes through the primary heat exchanger 10 is sent to the secondary heat exchanger 20 via the flow path member 50.

Figure 5:
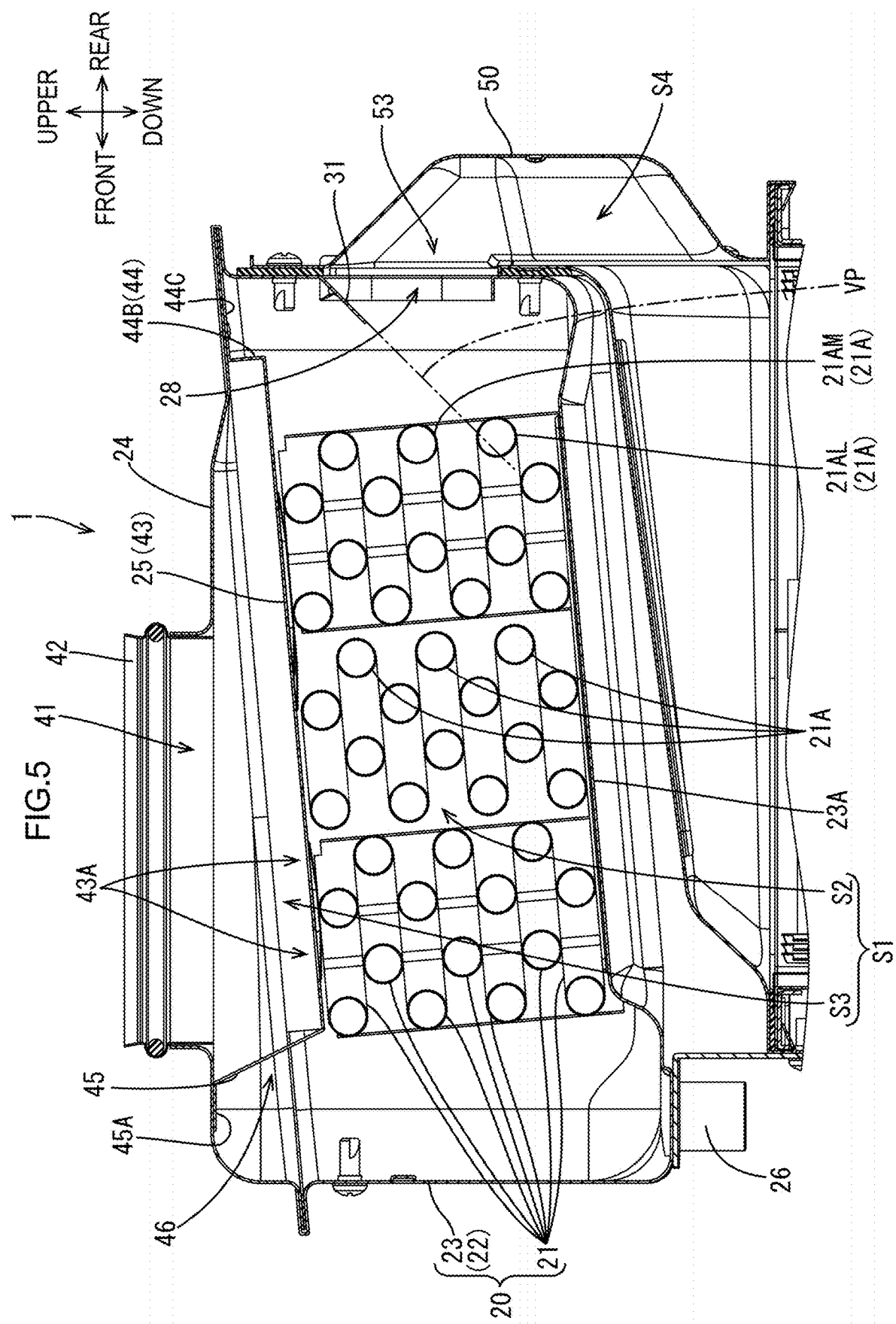
FIG. 5 is a cross-sectional view taken along A-A line in FIG. 4.

As illustrated in FIG. 5, the secondary heat exchanger 20 includes the heat transfer pipes 21 (seven heat transfer pipes 21 in this embodiment) and a case 22 in which the heat transfer pipes 21 are arranged. The heat transfer pipes 21 and the case 22 may be made of stainless steel having good corrosion resistance.

[Case, Case Body]

Figure 11:
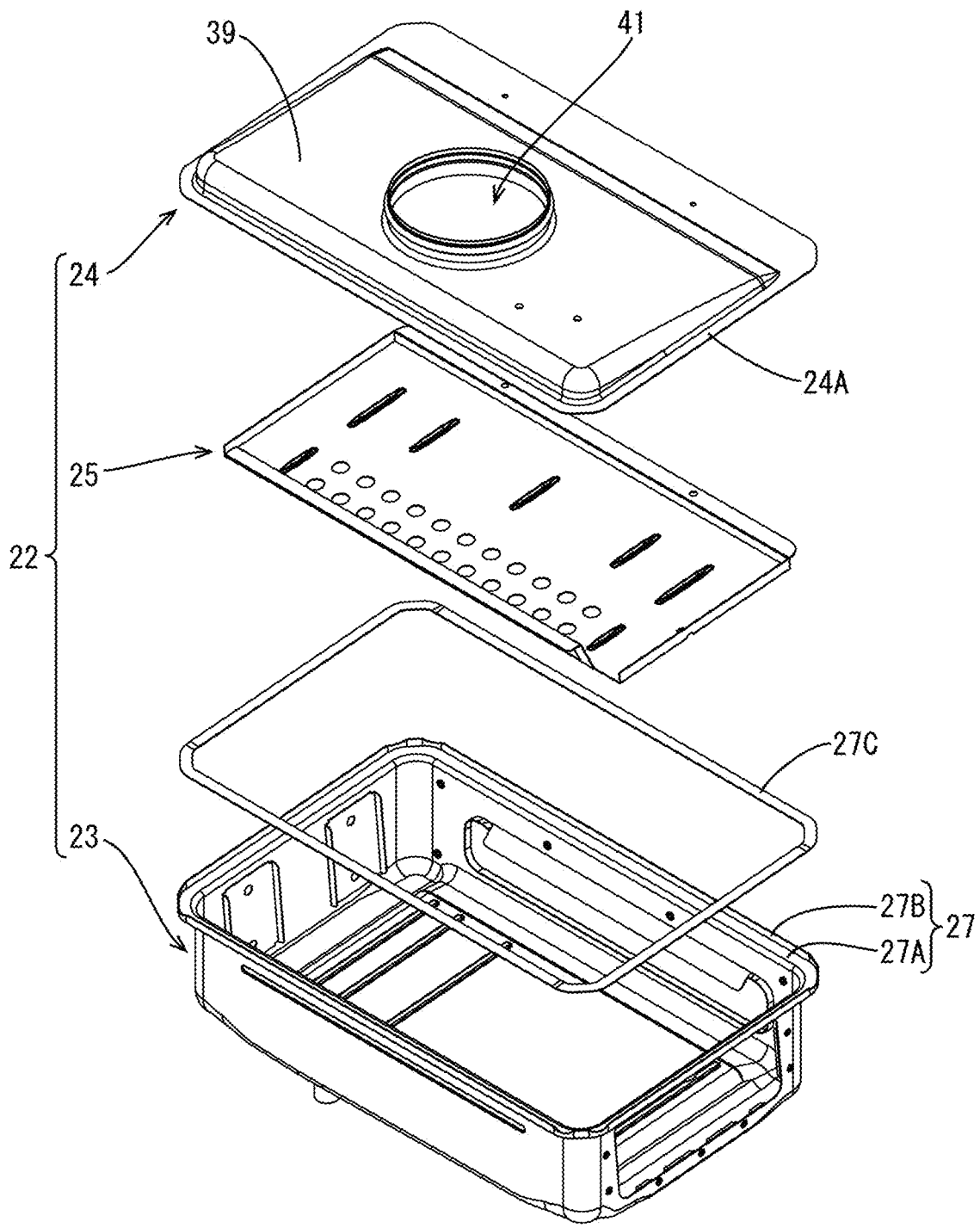
FIG. 11 is an exploded view of the case of the secondary heat exchanger.

As illustrated in FIG. 11, the case 22 includes a case body 23, a cover 24, and a partition 25. The case body 23 has a bottomed box shape that opens upward. The case body 23 is covered with the cover 24 from above. The partition 25 is disposed inside the case 22.

Figure 14:
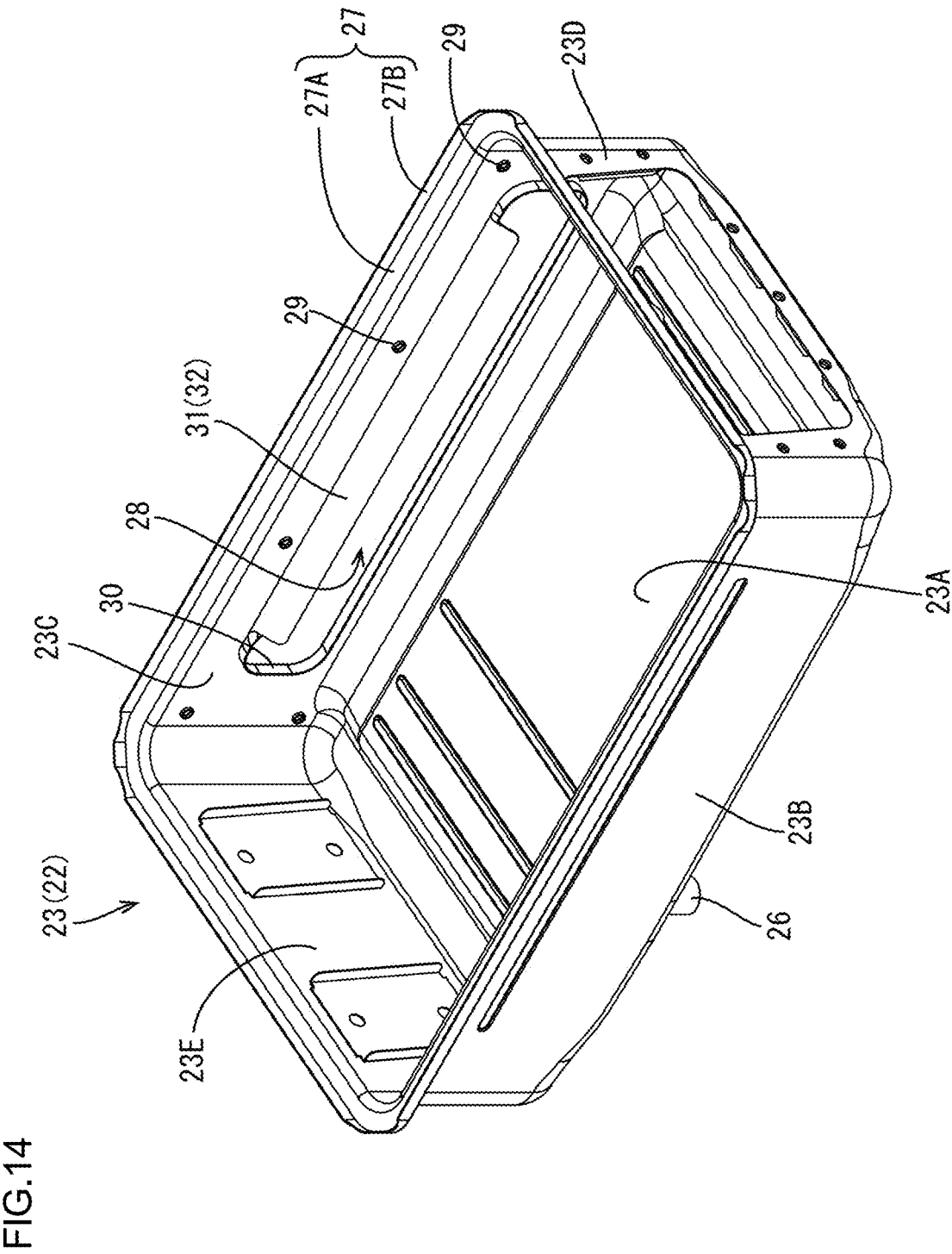
FIG. 14 is a perspective view of the case body.

As illustrated in FIG. 14, the case body 23 includes a bottom wall 23A, a front wall 23B, a rear wall 23C, a right wall 23D, and a left wall 23E. The front wall 23B extends upward from a front edge of the bottom wall 23A. The rear wall 23C extends upward from a rear edge of the bottom wall 23A. The right wall 23D extends upward from a right edge of the bottom wall 23A. The left wall extends upward from a left edge of the bottom wall 23A. The front wall 23B, the rear wall 23C, the right wall 23D, and the left wall 23E are configured as a peripheral wall of the case body 23. The drain discharge port 26 is on a front section of the bottom wall 23A so as to extend through the bottom wall 23A in the upper-bottom direction. As illustrated in FIG. 5, the case 22 is disposed in the water heater 1 such that the bottom wall 23A is sloped downward as it extends frontward. With such a configuration, drain water generated according to recovery of latent heat in the secondary heat exchanger 20 easily flows to the drain discharge port 26.

Figure 6:
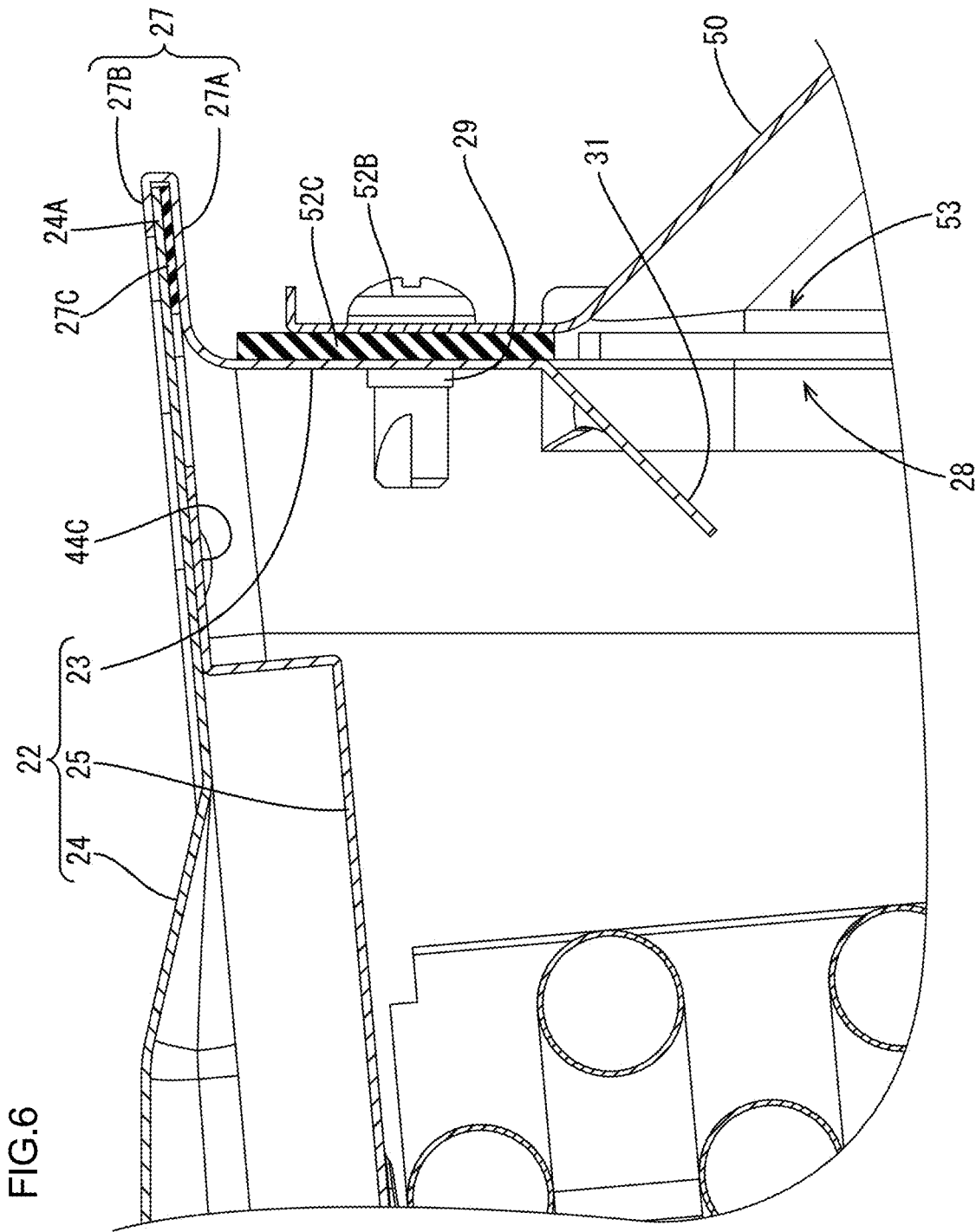
FIG. 6 is an expanded view of FIG. 5 illustrating a surrounding portion near a fixing portion of a case body.

As illustrated in FIG. 11, the case body 23 includes a fixing portion 27 at an upper edge of the peripheral wall. The fixing portion 27 is for fixing the cover 24 to the case body 23 with crimping. As illustrated in FIG. 14, the fixing portion 27 includes a flange portion 27A and a crimping portion 27B. The flange portion 27A extends from the upper edge of the peripheral wall outward in a flange shape. The crimping portion 27B extends upward from an outer edge of the flange portion 27A. As illustrated in FIG. 6, the crimping portion 27B is to be deformed when fixing the cover 24 to the case body 23 with crimping. With the cover 24 being fixed to the case body 23 with crimping, the crimping portion 27B is deformed such that the deformed crimping portion 27B and the flange portion 27A sandwich a fixed portion 24A, which is an outer peripheral portion of the cover 24, with respect to the upper-bottom direction. A ring-shaped intermediate member 27C is disposed between the fixed portion 24A and the crimping portion 27B to prevent air from passing through a space between the cover 24 and the case body 23.

[Gas Inlet]

Figure 7:
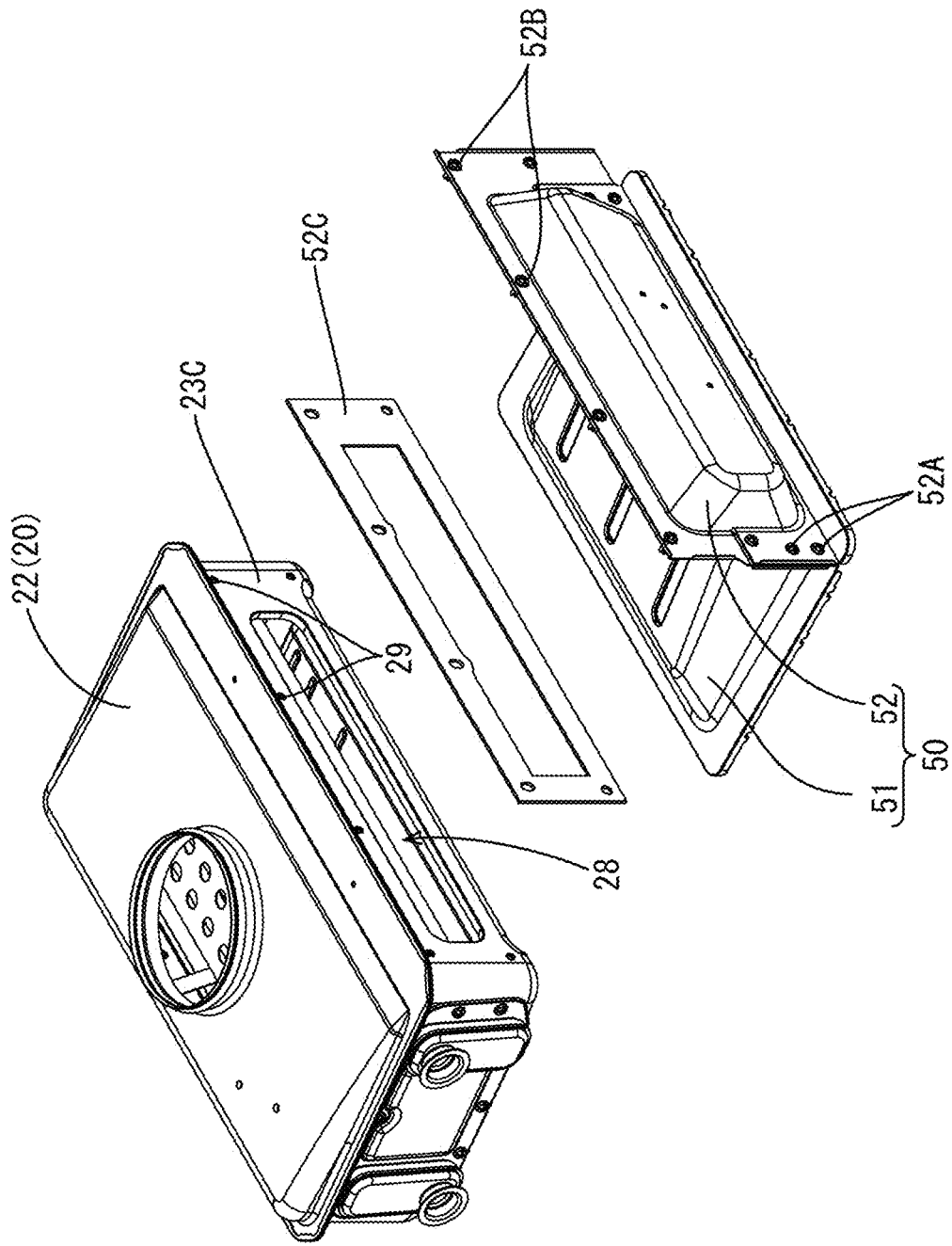
FIG. 7 is a perspective view illustrating a secondary heat exchanger and a flow path member that is to be fixed to the secondary heat exchanger.

As illustrated in FIG. 14, the case body 23 includes a gas inlet 28 in the rear wall 23C and the gas inlet 28 is through the rear wall 23C in the front-rear direction. The gas inlet 28 is a hole through which combustion exhaust gas flows into the case 22. Fixing portions 29 are provided in a peripheral section of the rear wall 23C around the gas inlet 28. The fixing portions 29 have a form of a female screw. As illustrated in FIGS. 6 and 7, the flow path member 50 is fixed to the case body 23 with the fixing portions 29. Combustion exhaust gas flows from the flow path member 50 into the case 22 through the gas inlet 28.

[Guide Plate, Flow Restriction Member]

As illustrated in FIG. 14, a burring portion 30 extends from a hole edge of the gas inlet 28 toward the inside of the case 22. A guide plate 31 extends from an upper hole edge of the gas inlet 28 to the inside of the case 22. The guide plate 31 is continuous to the burring portion 30 and is integrally formed with the case body 23. The guide plate 31 is inclined downward as it extends inward. The guide plate 31 is configured as a flow restriction member 32. With the guide plate 31, the combustion exhaust gas that flows into the case 22 through the gas inlet 28 is less likely to flow upward.

As illustrated in FIG. 8, the case body 23 includes a right opening 33 in the right wall 23D and the right opening 33 is through the right wall 23D with respect to the right-left direction. The right opening 33 is a hole in which the heat transfer pipes 21 that are included in an assembly unit 35 are disposed. Fixing portions 34 are provided in a peripheral section of the right wall 23D around the right opening 33.

The fixing portions 34 have a form of a female screw and are used for fixing the assembly unit 35 to the case 22.

[Heat Transfer Tubes]

As illustrated in FIG. 8, the assembly unit 35 includes the heat transfer pipes 21, a closing member 36 having a plate shape, the first header 37, and the second header 38.

Figure 10:
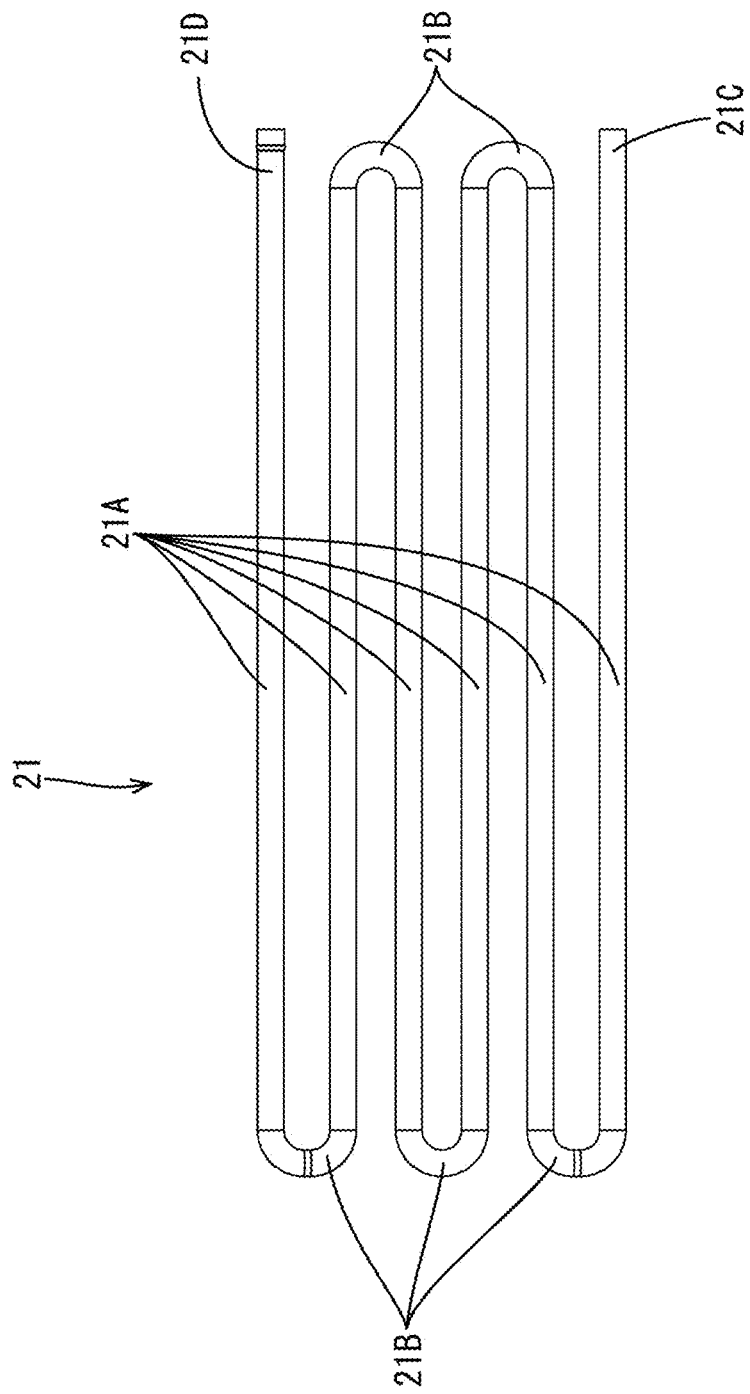
FIG. 10 is a plan view of a heat transfer pipe of the secondary heat exchanger.

As illustrated in FIG. 10, the heat transfer pipe 21 extends along a certain plane surface with meandering. The heat transfer pipes 21 have a common shape. The heat transfer pipe 21 includes straight pipe portions 21A (six straight pipe portions 21A in this embodiment), at least one U-shaped pipe portion 21B (five U-shaped pipe portions 21B in this embodiment), a first connection end portion 21C, and a second connection end portion 21D.

[Straight Pipe Portions]

The straight pipe portions 21A are arranged parallel to each other with respect to a direction (the front-rear direction) perpendicular to an extending direction (the right-left direction) in which the straight pipe portions 21A extend. Ends of two adjacent straight pipe portions 21A with respect to the right-left direction are connected by the U-shaped pipe portion 21B that is bent in a form of U-shape. Right ends of a first one and a last one of the straight pipe portions 21A with respect to the front-rear direction are not connected to the U-shaped pipe portions 21B but are open rightward. The right end of the first one of the straight pipe portions 21A is the first connection end portion 21C and the right end of the last one of the straight pipe portions 21A is the second connection end portion 21D. The straight pipe portions 21A and the U-shaped pipe portions 21B are connected alternately from the first connection end portion 21C to the second connection end portion 21D and are configured as the heat transfer pipe 21 that is a unitary component.

As illustrated in FIG. 8, the heat transfer pipes 21 are disposed on top of each other in the upper-bottom direction and are fixed to the closing member 36 and arranged in the case 22. As illustrated in FIG. 5, with the heat transfer pipes 21 being arranged in the case 22, the straight pipe portions 21A extend in the right-left direction and are arranged at intervals with respect to the upper-bottom direction and the front-rear direction. More in detail, the two heat transfer pipes 21 that are adjacent to each other in the upper-bottom direction are disposed to be displaced from each other in the front-rear direction. Namely, the two heat transfer pipes 21 that are adjacent to each other in the upper-bottom direction are disposed such that the straight pipe portions 21A of the two heat transfer pipes 21 do not overlap with respect to the upper-bottom direction. As illustrated in FIG. 5, the straight pipe portions 21A are arranged in a zig-zag manner as whole in a vertical cross-sectional view. The straight pipe portions 21A of the heat transfer pipes 21 are disposed to extend in a direction perpendicular to a direction in which the combustion exhaust gas flows (the front-rear direction and the upper-bottom direction). Heat exchange between the water flowing through the heat transfer pipes 21 and the combustion exhaust gas is mainly performed in the straight pipe portions 21A.

As illustrated in FIG. 8, the closing member 36 is a plate member for closing the right opening 33 from the right side with the heat transfer pipes 21 being arranged in the case 22. As illustrated in FIG. 9, the closing member 36 includes first through holes, second through holes, and insertion holes that are through in the right-left direction. The first connection end portions 21C of the heat transfer pipes 21 are inserted through the first through holes, respectively. The second connection end portions 21D of the heat transfer pipes 21 are inserted through the second through holes, respectively.

Fixing members 36A are inserted through the insertion holes. Burring portions extend from hole edges of the first through holes and the second through holes. The first connection end portions 21C that are inserted through the first through holes are fixed to the closing member 36 with brazing. Similarly, the second connection end portions 21D that are inserted through the second through holes are fixed to the closing member 36 with brazing. As illustrated in FIG. 8, the insertion holes are at positions corresponding to the fixing portions 34. The fixing member 36A that are inserted in the insertion holes are coupled to the fixing portions 34, respectively, and accordingly, the closing member 36 is fixed to the right wall 23D. A ring-shaped intermediate member 36B is disposed between the right wall 23D and the closing member 36 such that air does not pass through a space between the right wall 23D and the closing member 36.

As illustrated in FIG. 3, the first header 37 connects an inlet of the secondary heat exchanger 20 (specifically, the openings of the first connection end portions 21C of the heat transfer pipes 21) and a downstream end of the water inflow pipe 13. As illustrated in FIG. 9, the first header 37 includes a first header body 37A, a first header cover 37B, and a joint 37C. The first header body 37A is fixed to the closing member 36. The first header cover 37B covers an opening of the first header body 37A. The joint 37C has a tubular shape. The first header body 37A includes first bottom holes 37D through which the first connection end portions 21C that pass through the first through holes of the closing member 36 are inserted. The first header cover 37B includes a first cover hole 37E in which the joint 37C is fitted. The joint 37C is connected to a downstream end of the water inflow pipe 13.

As illustrated in FIG. 3, the second header 38 connects an outlet of the secondary heat exchanger 20 (specifically, the openings of the second connection end portions 21D of the heat transfer pipes 21) and a pipe that is connected to an inlet of the primary heat exchanger 10 (specifically, an upstream end of the connection pipe 15). As illustrated in FIG. 9, the second header 38 includes a second header body 38A, a second header cover 38B, and a joint 38C. The second header body 38A is fixed to the closing member 36. The second header cover 38B covers an opening of the second header body 38A. The joint 38C has a tubular shape. The second header body 38A includes second bottom holes 38D through which the second connection end portions 21D that pass through the second through holes in the closing member 36 are inserted. The second header cover 38B includes a second cover hole 38E in which the joint 38C is fitted. The joint 38C is connected to the upstream end of the connection pipe 15.

The coupling of the components of each of the first header 37 and the second header 38 and fixing of each of the first header 37 and the second header 38 to the closing member 36 may be performed with brazing or welding.

In the secondary heat exchanger 20, the water supplied from the water inflow pipe 13 enters the heat transfer pipes 21 from the first connection end portions 21C via the first header 37. The water flowing through the heat transfer pipes 21 with meandering exchanges heat with the combustion exhaust gas that flows inside the case 22. The flowing water that is heated by heat exchange flows into the connection pipe 15 from the second connection end portions 21D via the second header 38.

[Cover]

Figure 4:
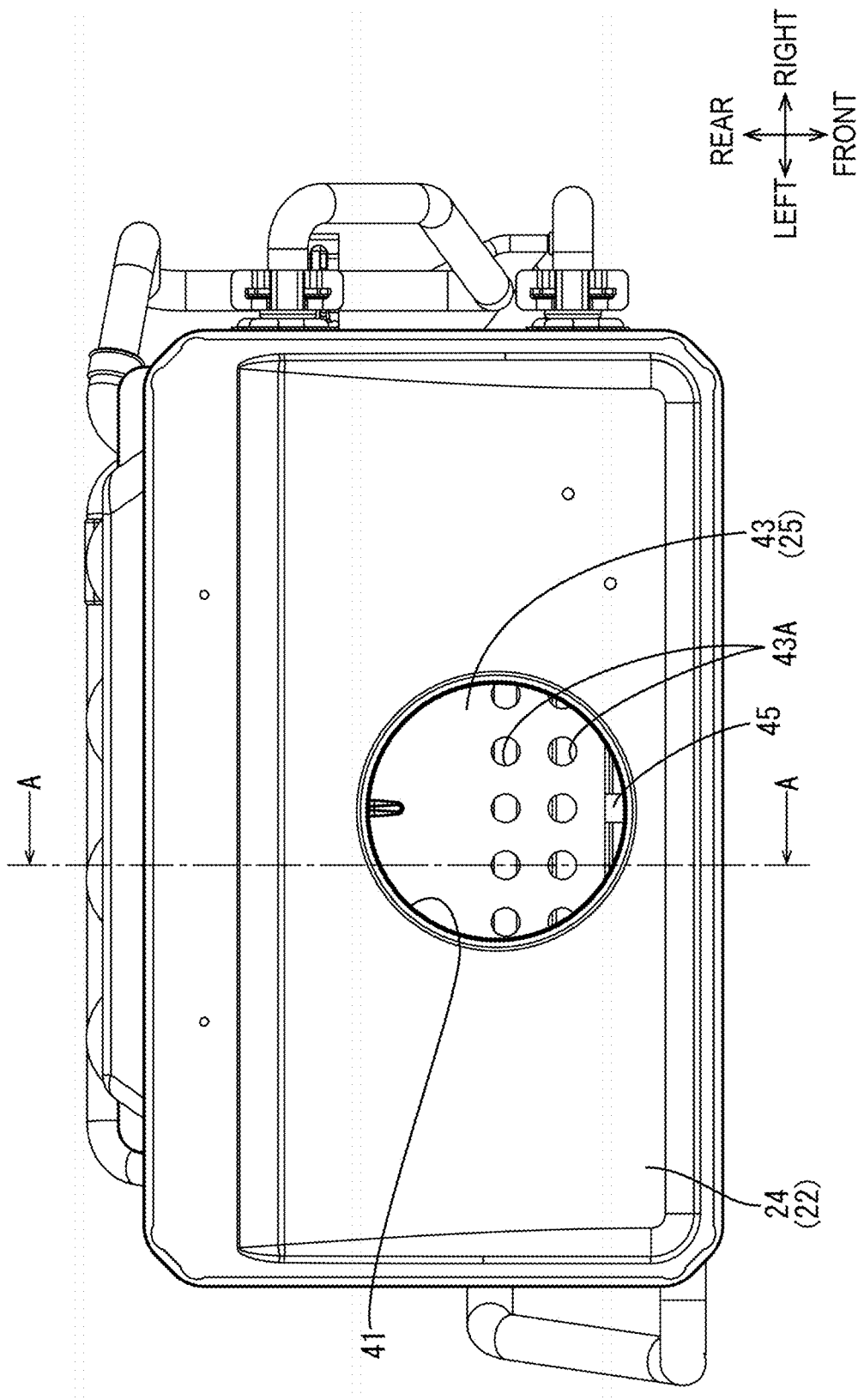
FIG. 4 is a plan view of the inner body.

As illustrated in FIG. 11, the cover 24 is a plate member and includes a protruded portion 39 in a middle section and the fixed portion 24A in a peripheral portion that extends around and outside the protruded portion 39. The protruded portion 39 protrudes upward. The protruded portion 39 includes a gas outlet 41 in a top surface. The gas outlet 41 is through the protruded portion 39 in the upper-bottom direction. As illustrated in FIG. 4, the gas outlet 41 is at a middle position with respect to the right-left direction and closer to the front side. As illustrated in FIG. 5, a discharge portion 42 extends upward from a hole edge of the gas outlet 41. The discharge portion 42 has a tubular shape. Latent heat of the combustion exhaust gas is recovered in the secondary heat exchanger 20 and the combustion exhaust gas is discharged outside through the gas outlet 41. Specifically, the combustion exhaust gas is discharged outside via a discharge pipe that is connected to the discharge portion 42.

As illustrated in FIG. 11, when fixing the cover 24 to the case body 23 with crimping, the fixed portion 24A is disposed above the flange portion 27A of the case body 23 and crimped with the crimping portion 27B. As illustrated in FIG. 6, the fixed portion 24A is sandwiched by the flange portion 27A and the crimping portion 27B with respect to the upper-bottom direction. By fixing the cover 24 to the case body 23 with crimping, the case body 23 is closed.

[Partition]

As illustrated in FIG. 5, the partition 25 is a plate member that is fixed to a lower surface of the cover 24. The partition 25 divides a space S1 inside the case 22 into an upper section and a lower section. The space S1 is defined by the case body 23 and the cover 24. Specifically, the partition 25 divides the space S1 into an arrangement section S2 in which the heat transfer pipes 21 are arranged and an upper section S3 that is above the arrangement section S2 and closer to the cover 24. The upper section S3 is communicated with the gas outlet 41 on an upper side. The arrangement section S2 is communicated with the upper section S3 via a hole 46 and through holes 43A in the partition 25.

Figure 13:
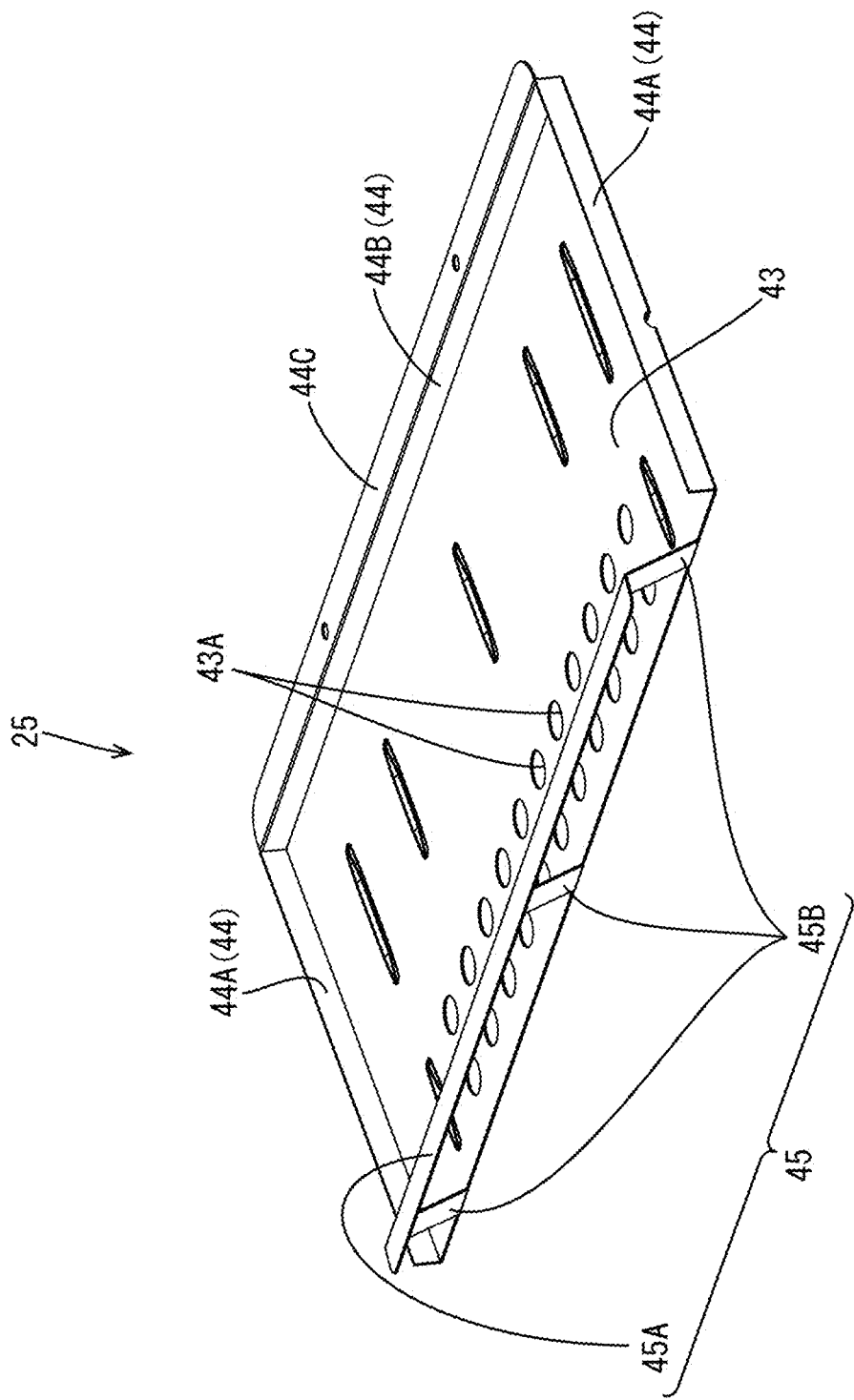
FIG. 13 is a perspective view of the partition.

As illustrated in FIG. 13, the partition 25 includes a bottom plate 43, extending walls 44, and an extending member 45. The extending walls 44 extend upward from right and left edges and a rear edge of the bottom plate 43. The extending member 45 extends upward from a front edge of the bottom plate 43. The bottom plate 43 has a rectangular plate shape. The bottom plate 43 includes the through holes 43A (twenty-two through holes 43A in this embodiment) that are through the bottom plate 43 in the upper-bottom direction. Two rows of through holes 43A are arranged in front side area of the bottom plate 43 and are arranged in a middle section with respect to the right-left direction. The front side area corresponds to one-third of an entire area of the bottom plate 43. As illustrated in FIG. 4, some of the through holes 43A are disposed directly below the gas outlet 41 in the case 22. As illustrated in FIG. 5, the arrangement section S2 and the upper section S3 are continuous to each other via the through holes 43A. The bottom plate 43 is disposed below the cover 24 with being spaced from the cover 24.

As illustrated in FIG. 13, the extending walls 44 include side extending walls 44A that extend from the right and left edges of the bottom plate 43 and a rear extending wall 44B that extends from the rear edge of the bottom plate 43. The side extending walls 44A extend vertically upward from the bottom plate 43. The rear extending wall 44B includes a vertical portion that extends vertically upward from the bottom plate 43 and a first fixing portion 44C that extends rearward from an upper end of the vertical portion.

In this embodiment, the extending member 45 includes a second fixing portion 45A and three extending portions 45B. The second fixing portion 45A is elongated in the right-left direction. The extending portions 45B extend upward and obliquely from a front edge of the bottom plate 43 and are connected to the second fixing portion 45A. The extending portions 45B extend from a middle, a left end section, and a right end section of the second fixing portion 45A. Unlike this embodiment, extending members may extend from a front edge of the bottom plate so as to be spaced from each other and each of the extending members may include one second fixing portion and one extending portion.

Figure 12:
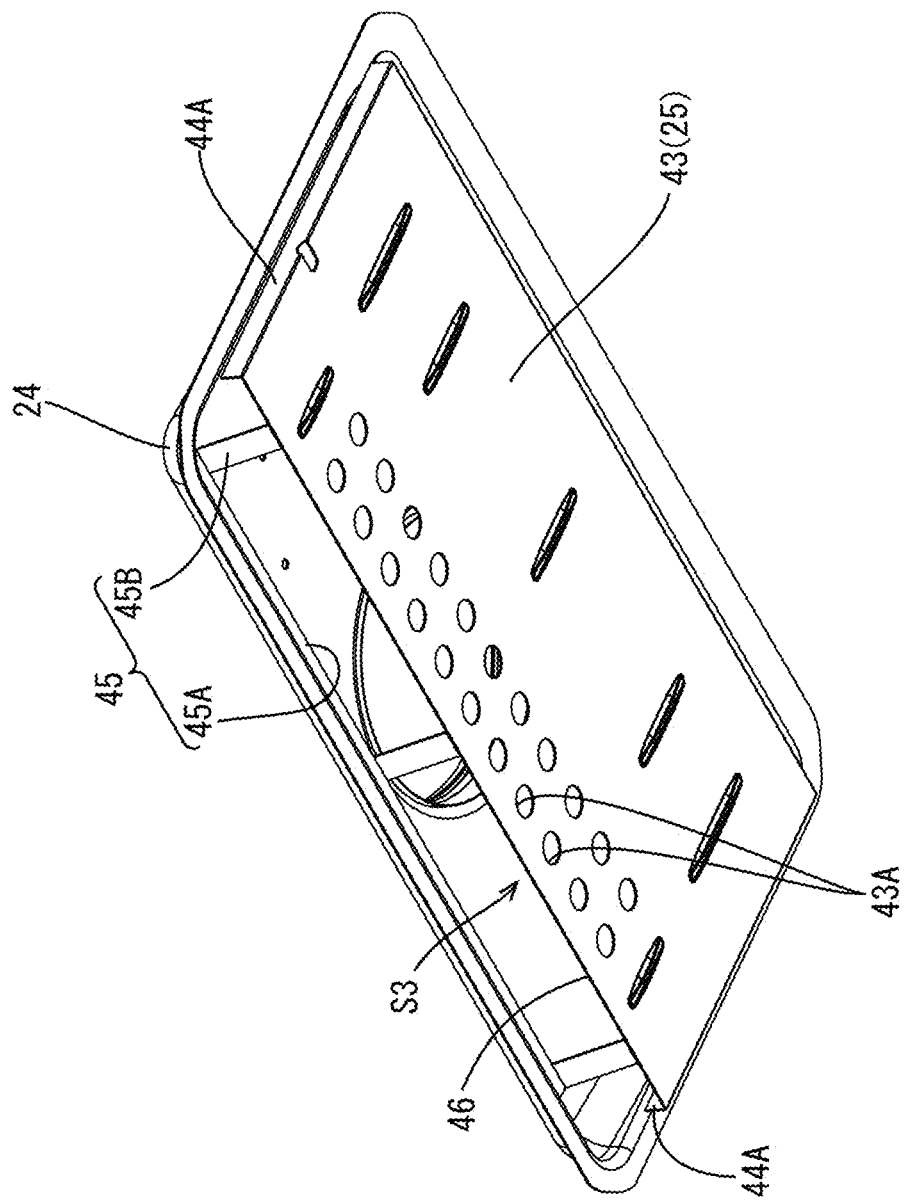
FIG. 12 is a perspective view illustrating a cover to which a partition is fixed.

As illustrated in FIG. 5, the partition 25 is fixed to the cover 24 by fixing the first fixing portion 44C of the extending wall 44 and the second fixing portion 45A of the extending member 45 to the lower surface of the cover 24 with welding. With the partition 25 being fixed to the cover 24, as illustrated in FIG. 12, the hole 46 is defined by the cover 24 and the front edge of the partition 25. The hole 46 is through in the front-rear direction. The space (the upper section S3) defined by the cover 24 and the partition 25 is open frontward through the hole 46. As illustrated in FIG. 5, the upper section S3 and the arrangement section S2 are continuous to each other through the hole 46. The upper section S3 is closed on a rear side by the rear extending wall 44B. As illustrated in FIG. 12, the upper section S3 is defined by the side extending walls 44A on the lateral sides.

Therefore, as illustrated in FIG. 5, the arrangement section S2 and the upper section S3 are connected to each other through the through holes 43A and the hole 46.

As illustrated in FIG. 5, the hole 46 is in front of the heat transfer pipes 21 in the case 22. Some of the straight pipe portions 21A that are on the front side and closest to the front wall 23B are defined as first straight pipe portions 21A. The combustion exhaust gas that flows to the vicinity of the first straight pipe portions 21A flows from the arrangement section S2 to the upper section S3 through the hole 46 (refer to FIG. 16). Therefore, heat can be recovered by the first straight pipe portions 21A that are closest to the front wall 23B and heat transfer efficiency of transferring heat from the combustion exhaust gas to the water inside the heat transfer pipes 21 can be improved.

On the other hand, the through holes 43A in the partition 25 are on a rear side with respect to the hole 46 in the case 22 and are above some of the heat transfer pipes 21 that are arranged in a front section of the case 22. According to such a configuration, a part of the combustion gas that flows from the gas inlet 28 to the front section of the arrangement section S2 flows from the arrangement section S2 to the upper section S3 through the through holes 43A in a section behind the first straight pipe portions 21A (refer to FIG. 16). A discharge path (cavity) extending from the arrangement section S2 to the upper section S3 through the through holes 43A is shorter than a discharge path (cavity) extending from the arrangement section S2 to the upper section S3 through the hole 46 that is in a front section in the case 22 and the discharge path extending through the through holes 43A is a shortcut discharge path. This decreases thermal efficiency of the secondary heat exchanger 20 and suppresses increase in exhaust resistance of combustion exhaust gas. Therefore, high combustion performance of the water heater 1 can be maintained.

[Flow Path Member]

As illustrated in FIG. 5, the flow path member 50 is disposed between the primary heat exchanger 10 and the secondary heat exchanger 20. The flow path member 50 defines a gas flow cavity that is continuous to an upper opening of the case 11 of the primary heat exchanger 10 and the gas inlet 28 in the rear wall 23C of the case 22. The gas flow cavity has an inner space S4 through which combustion exhaust gas flows. The gas flow cavity defined by the flow path member 50 connects the primary heat exchanger 10 and the secondary gas exchanger 20.

Figure 15:
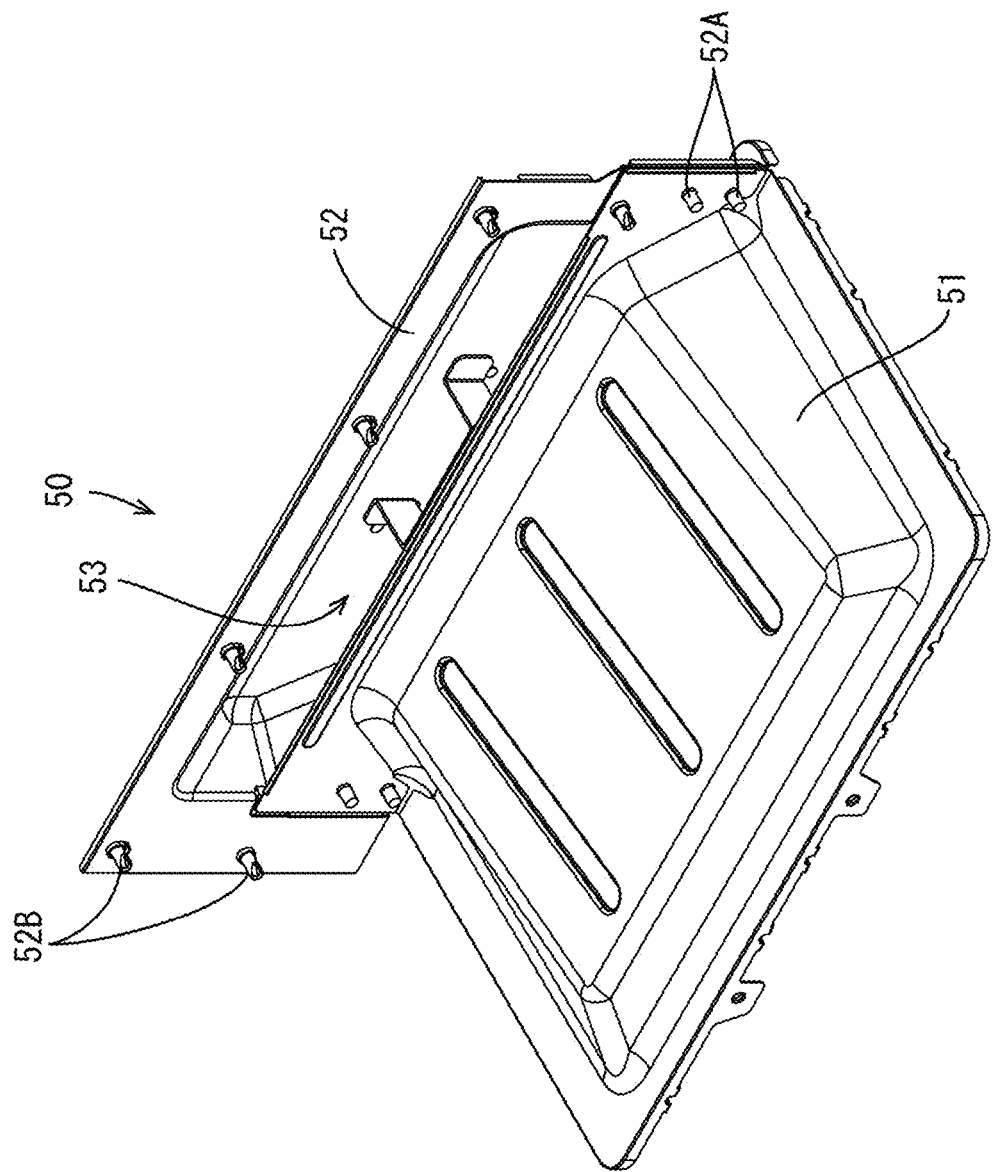
FIG. 15 is a perspective view of the flow path member.

As illustrated in FIG. 15, the flow path member 50 includes a flow path body 51 and a flow path rear wall 52.

The flow path body 51 is a plate member as a whole and includes a protruding portion in a middle. The protruding portion protrudes upward. The protruding portion has a protruding dimension that increases as it extends rearward. The protruding portion has an upper surface that is sloped upward as it extends rearward. The flow path body 51 opens downward and rearward. The flow path body 51 includes a rear wall having a rear opening opens rearward. The flow path body 51 further includes fixing portions in the rear wall around the rear opening. The fixing portions have a form of female screw and fixing members 52A are coupled to the fixing portions, respectively.

The flow path rear wall 52 has a shape of a square plate and includes a recess portion that is recessed rearward. The flow path rear wall 52 includes insertion holes at positions corresponding to the fixing portions of the flow path body 51. The fixing members 52A that are inserted through the corresponding insertion holes are coupled to the fixing portions of the flow path body 51, respectively. Accordingly, as illustrated in FIG. 7, the flow path rear wall 52 is fixed to the flow path body 51 so as to close the rear opening of the flow path body 51. An intermediate member is disposed between the flow path body 51 and the flow path rear wall 52 to prevent air from passing through a space between the flow path body 51 and the flow path rear wall 52.

As illustrated in FIG. 7, the flow path rear wall 52 includes insertion holes at positions corresponding to the fixing portions 29 in the rear wall 23C, respectively. With the fixing members 52B that are inserted through the insertion holes being coupled to the fixing portions 29, respectively, the flow path rear wall 52 is fixed to the rear wall 23C. A ring-shaped intermediate member 52C is disposed between the rear wall 23C and the flow path rear wall 52. The intermediate member 52C prevents air from leaking from a space between the rear wall 23C and the flow path rear wall 52.

As illustrated in FIG. 15, the recess portion of the flow path rear wall 52 opens frontward. An upper section of a frontward opening of the flow path rear wall 52 is an opening 53. The gas flow cavity, which defines the inner space S4, extends from the upper opening of the primary heat exchanger 10 to the opening 53. As illustrated in FIG. 5, the opening 53 is an end of the gas flow cavity, which defines the inner space S4, of the flow path member 50 and is continuous to the gas inlet 28 of the secondary heat exchanger 20 with the flow path member 50 being fixed to the case 22. An upper wall of the recess portion of the flow path rear wall 52 is inclined upward as it extends frontward or toward the opening 53. Therefore, the gas flow cavity, which defines the inner space S4, extends obliquely in a front-upper direction as it extends closer to the opening 53, which is the end of the gas flow cavity. The upper hole edge of the opening 53 and the upper hole edge of the gas inlet 28 are at a same level (refer to FIG. 6).

Combustion exhaust gas has a temperature that is normally higher (about 200° C.) than the ambient temperature and combustion exhaust gas tends to rise. Therefore, if a discharge cavity of combustion exhaust gas has a space that extends upward, the combustion exhaust gas may stay in the space and drift may occur. However, in this embodiment, the inner space S4 of the gas flow cavity extends upward as it is closer to the opening 53, which is the end of the gas flow cavity. Furthermore, the upper hole edge of the opening 53 matches the upper hole edge of the gas inlet 28. With such a configuration, when combustion exhaust gas flows from the flow path member 50 into the case 22, drift of the combustion exhaust gas does not occur in the inner space S4 of the gas flow cavity defined by the flow path member 50. This suppresses increase in exhaust resistance of combustion exhaust gas and high combustion performance of the water heater 1 can be maintained.

[Restriction of Combustion Exhaust Gas Flow by Guide Plate]

Figure 16:
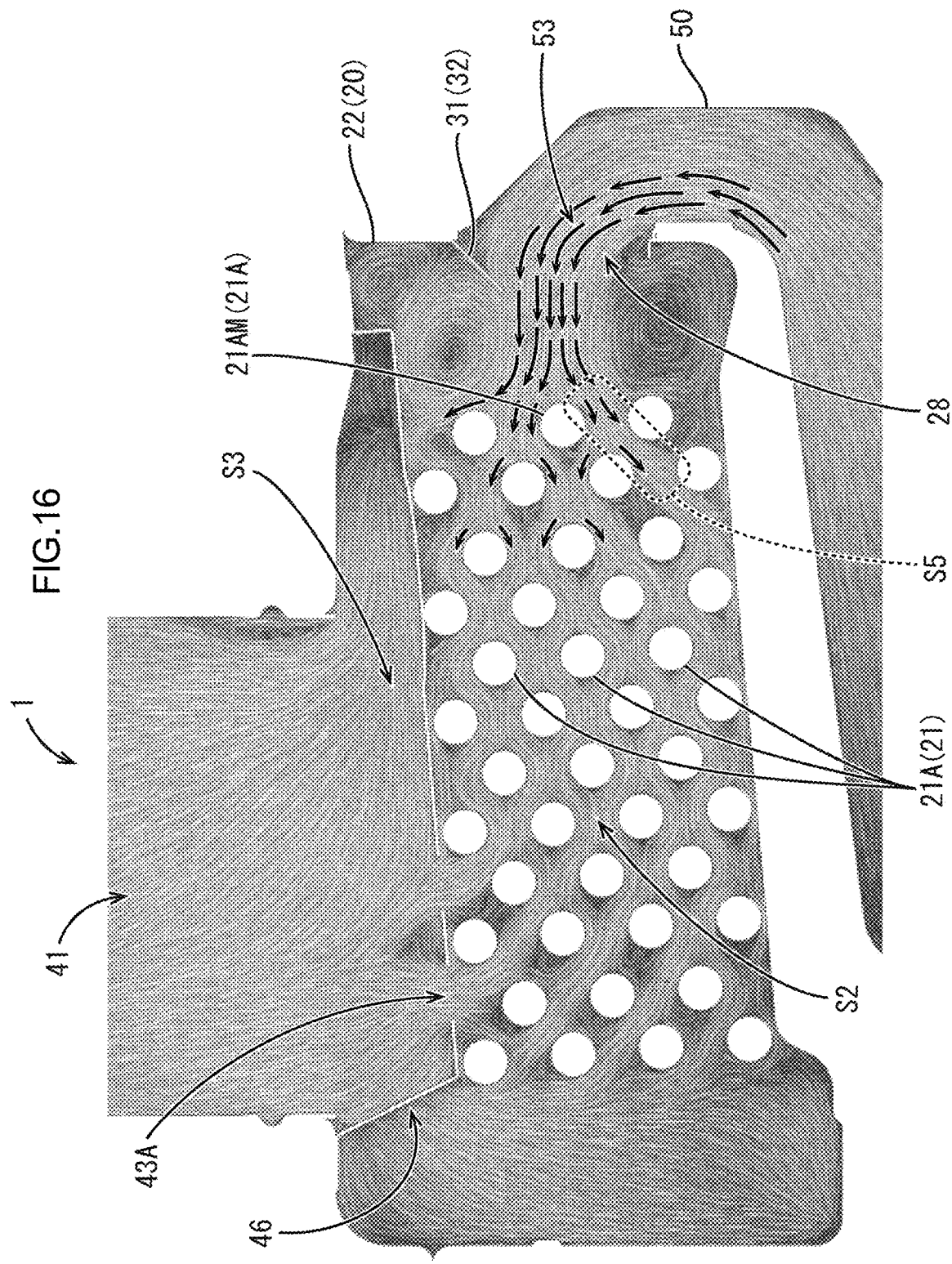
FIG. 16 is a cross-sectional view of a middle section of the secondary heat exchanger with respect to a right-left direction and illustrating a flow of combustion exhaust gas.
Figure 17:
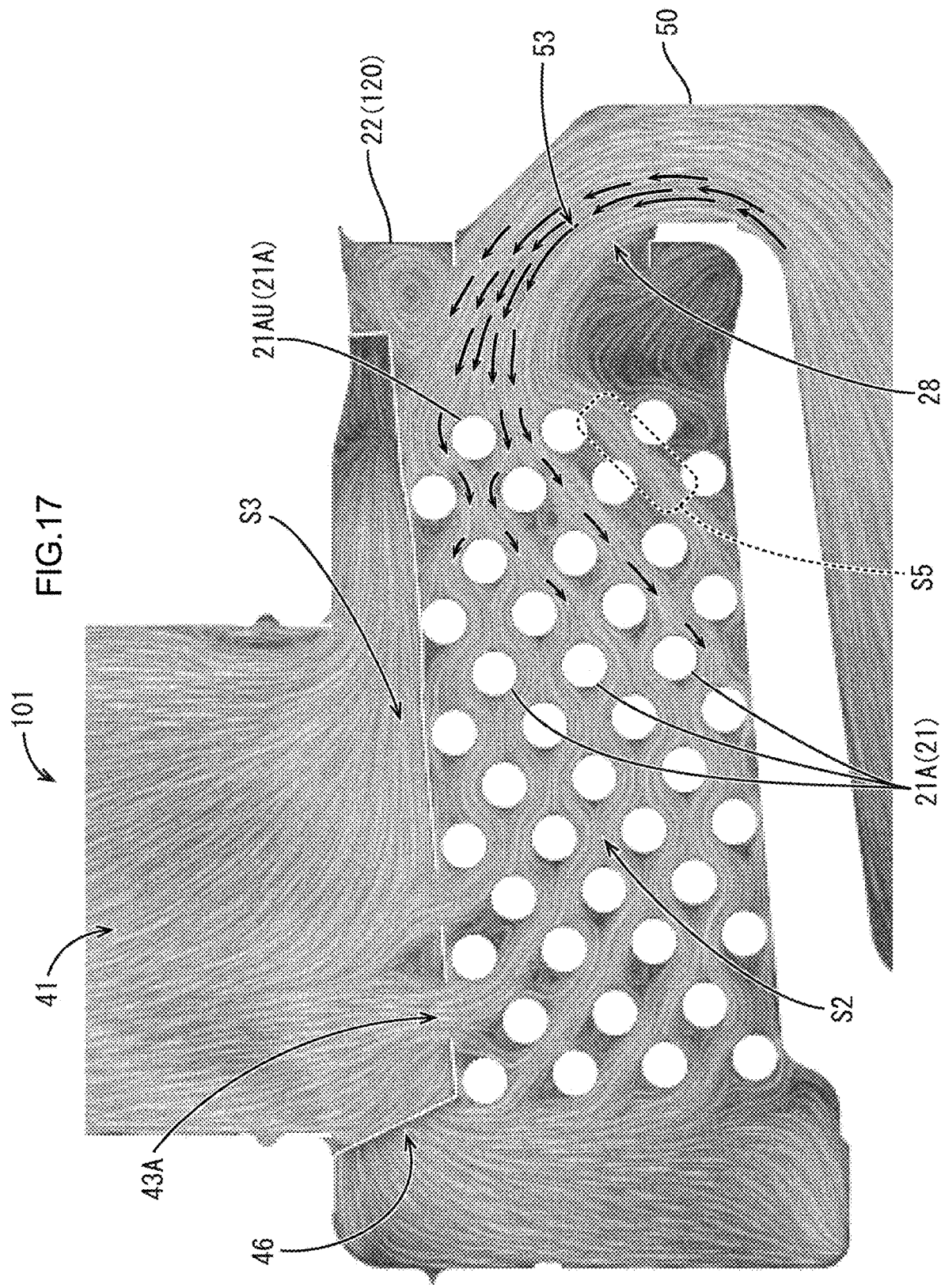
FIG. 17 is a cross-sectional view of a middle section of a secondary heat exchanger without including a guide plate with respect to a right-left direction and illustrating a flow of combustion exhaust gas.

Hereinafter, restriction of combustion exhaust gas flow by the guide plate 31 according to this embodiment will be described with reference to FIGS. 16 and 17. FIG. 16 describes a flow of combustion exhaust gas in the secondary heat exchanger 20 and the gas flow cavity defined by the flow path member 50 that is obtained with reference to calculation results of the flow velocity of combustion exhaust gas. In FIG. 16, flowing directions in which combustion exhaust gas flows fast are described by the arrows. Namely, the arrows indicate sections and the flowing directions in which a large quantity of combustion exhaust gas flows. FIG. 17 describes the flowing directions similarly to FIG. 16 and illustrates a secondary heat exchanger 120 of a water heater 101 according to a comparative example.

In the configurations of FIGS. 16 and 17, the combustion exhaust gas that is introduced into the secondary heat exchanger through the gas inlet 28 flows into spaces between the straight pipe portions 21A and spreads in a large space ranging in the upper-bottom direction. Thus, the combustion exhaust gas flows frontward inside the arrangement section S2. The combustion exhaust gas flows from the arrangement section S2 to the upper section S3 through the hole 46 or the through holes 43A and is finally discharged outside through the gas outlet 41.

First, a configuration of a water heater 101 that includes a secondary heat exchanger 120 will be described with reference to FIG. 17. The secondary heat exchanger 120 does not include a guide plate unlike the present embodiment. Configurations same as those of the first embodiment are indicated by the same reference signs as those in the first embodiment. In the configuration without including the guide plate, the combustion exhaust gas that is introduced into the case 22 through the gas inlet 28 flows upward and frontward due to the rising tendency of combustion exhaust gas. The combustion gas flows frontward mainly through a space adjacent to the straight pipe portion 21A (hereinafter, defined as a rearmost straight pipe portion 21AU) that is at a rearmost and upper position (specifically, at a sixth level from a lowest level). Then, the combustion gas flows into spaces between the heat transfer pipes 21.

As described above, in the configuration that the combustion exhaust gas flows frontward mainly in the space adjacent to the rearmost straight pipe portion 21AU, the combustion exhaust gas is less likely to flow to a section S5 adjacent to the straight pipe portions 21A that are at a rearmost and lower position. This decreases efficiency of heat exchange between the combustion exhaust gas and the water flowing through the straight pipe portions 21A that are disposed at the rearmost and lower position. Therefore, good thermal efficiency is less likely to be achieved in the secondary heat exchanger 120.

On the other hand, as illustrated in FIG. 16, the present embodiment includes the guide plate 31 at the upper hole edge of the gas inlet 28. The guide plate 31 extends obliquely downward from the upper hole edge of the gas inlet 28 toward the inside of the case 22. The combustion exhaust gas, which has rising tendency, tends to flow upward after entering the case 22 though the gas inlet 28 but is guided to flow frontward and downward by the guide plate 31. Therefore, the combustion exhaust gas flows frontward in spaces adjacent to the straight pipe portions 21A (hereinafter, defined as rearmost middle straight pipe portion 21AM) that are disposed at a rearmost and middle position with respect to the upper-bottom direction (specifically, at a fourth level from the lowest level). Then, the combustion exhaust gas flows into spaces between the heat transfer pipes 21.

As described above, in the configuration that the combustion exhaust gas passes mainly through the space adjacent to the rearmost middle straight pipe portion 21AM, the combustion exhaust gas spreads in a large space adjacent to the rearmost middle straight pipe portion 21AM ranging in the upper-bottom direction. Therefore, the combustion exhaust gas flows to the section S5 adjacent to the straight pipe portions 21A that are at the rearmost and lower position. This improves efficiency of heat exchange between the combustion exhaust gas and the water flowing through the straight pipe portions 21A that are disposed at the rearmost and lower position compared to the configuration without including the guide plate 31. Therefore, heat recovery efficiency in the secondary heat exchanger 20 can be improved.

As illustrated in FIG. 5, an imaginary plane surface VP extending from the guide plate 31 crosses the straight pipe portion 21A (hereinafter, defined as a rearmost lower straight pipe portion 21AL) that is disposed at a rearmost position and lower than the rearmost middle straight pipe portion 21AM (specifically, at a second level from the lowest level). With the inclination angle of the guide plate 31 with respect to the rear wall 23C being adjusted such that imaginary plane surface VP crosses the rearmost lower straight pipe portion 21AL, the combustion exhaust gas is likely to flow to the section S5 adjacent to the straight pipe portions 21A that are disposed at the rearmost and lower position.

[Operations and Effects of First Embodiment]

As previously described, the water heater 1 of this embodiment includes the primary heat exchanger 10, the secondary heat exchanger 20 that is disposed above the primary heat exchanger 10, the flow path member 50 that connects the primary heat exchanger 10 and the secondary heat exchanger 20. With the flow path member 50, the combustion exhaust gas discharged from the primary heat exchanger 10 is introduced into the secondary heat exchanger 20. The secondary heat exchanger 20 includes the case 22 and the heat transfer pipes 21 that are disposed in the case 22. The case 22 includes the gas inlet 28 in the rear wall 23C. The flow path member 50 is mounted on the rear wall 23C to cover the gas inlet 28. The case 22 includes the flow restriction member 32 with which the combustion exhaust gas introduced into the case 22 through the gas inlet 28 is less likely to flow upward.

According to such a configuration, the combustion exhaust gas that is introduced into the case 22 of the secondary heat exchanger 20 through the gas inlet 28 is guided by the flow restriction member 32 not to flow upward. Thereafter, the combustion exhaust gas flows frontward with being dispersed in a range extending in the upper-bottom direction. Accordingly, the combustion exhaust gas can flow to the heat transfer pipes 21 that are disposed adjacent to the gas inlet 28 and in the lower section of the case 22. Therefore, heat energy of combustion exhaust gas can be transferred to the water flowing in the heat transfer pipes 21 efficiently and thermal efficiency can be improved.

In this embodiment, the flow restriction member 32 is the guide plate 31 that is integrally included with the case 22 and extends obliquely and downwardly from the upper hole edge of the gas inlet 28 toward the inside of the case 22.

According to such a configuration, with the guide plate 31 being included integrally with the case 22, the thermal efficiency can be improved without increasing the number of components.

In this embodiment, the heat transfer pipes 21 include the straight pipe portions 21A that extend in the right-left direction second direction) and are arranged at intervals with respect to the upper-bottom direction (a first direction) and the front-rear direction (a third direction) with the heat transfer pipes 21 being arranged in the case 22. The imaginary plane surface VP extending from the guide plate 31 crosses the straight pipe portion 21A that is disposed at the rearmost position and lower than the middle position with respect to the upper-bottom direction.

According to such a configuration, the combustion exhaust gas that is introduced into the secondary heat exchanger 20 is guided downward by the guide plate 31 and flows frontward with changing its flowing direction to upward by the rising tendency of the combustion exhaust gas. Then, the combustion exhaust gas passes through spaces adjacent to the straight pipe portions 21A that are disposed at the rearmost and middle position with respect to the upper-bottom direction in the case 22. Then, the combustion exhaust gas flows frontward with being dispersed in a large space ranging in the upper-bottom direction and transfers heat to the straight pipe portions 21A. Thus, the combustion gas contacts with a greater number of heat transfer pipes 21 and efficient heat recovery can be performed. This improves thermal efficiency.

In this embodiment, the flow path member 50 defines the gas flow cavity having the inner space S4 in which the combustion exhaust gas flows. The flow path member 50 includes the opening 53 that opens frontward and is the end of the gas flow cavity having the inner space S4 therein. The gas flow cavity extends upward as it is closer to the opening 53. The opening 53 is continuous to the gas inlet 28 and the upper hole edge of the opening 53 and the upper hole edge of the gas inlet 28 are at the same level.

According to such a configuration, drift of the combustion exhaust gas is less likely to occur in the inner space S4 of the gas flow cavity defined by the flow path member 50. This suppresses increase in exhaust resistance of combustion exhaust gas.

Second Embodiment

Figure 18:
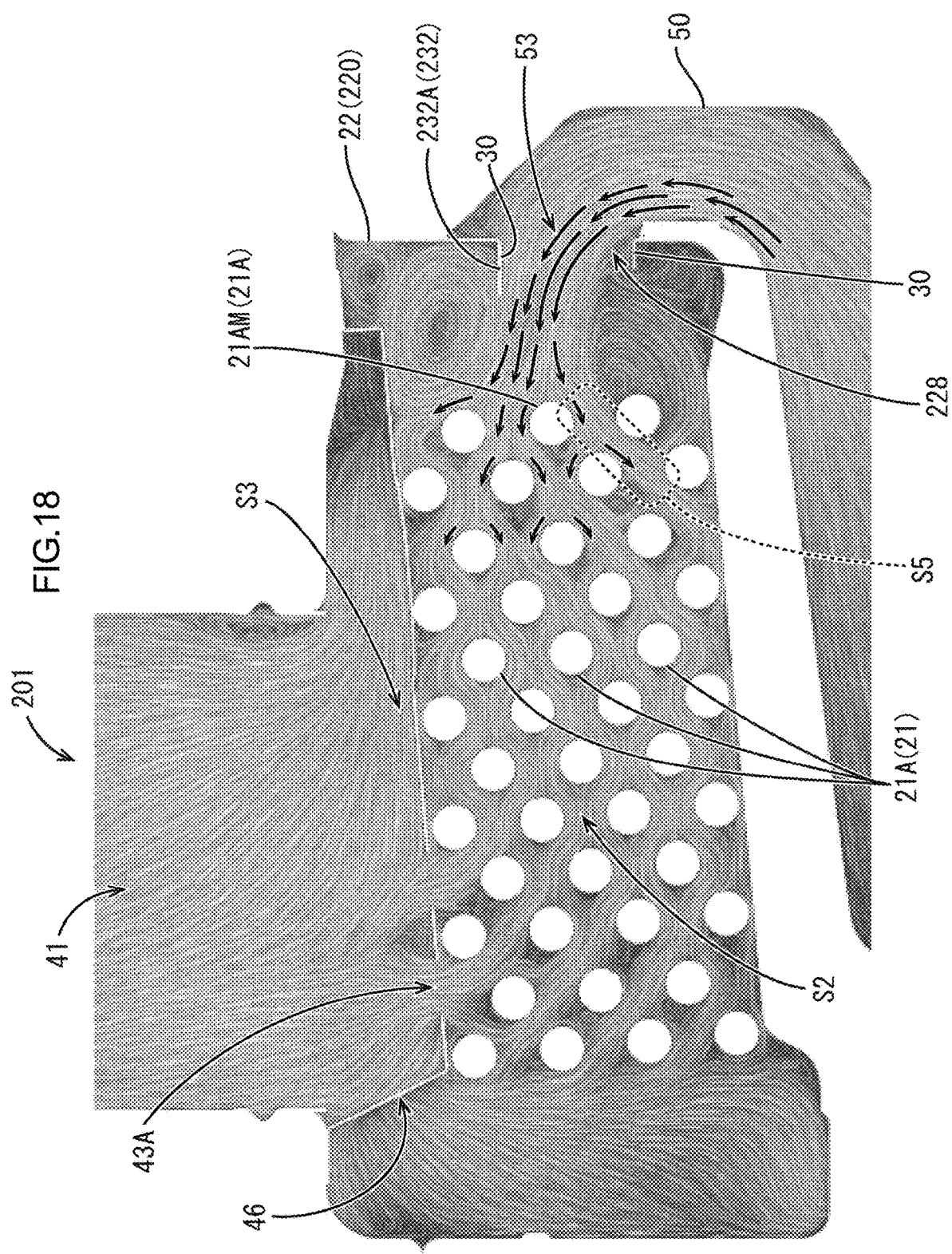
FIG. 18 is a cross-sectional view of a middle section of a secondary heat exchanger according to another embodiment with respect to a right-left direction and illustrating a flow of combustion exhaust gas.

A second embodiment will be described with reference to FIG. 18. FIG. 18 describes a flow of combustion exhaust gas in a secondary heat exchanger 220 and the gas flow cavity defined by the flow path member 50 similar to FIGS. 16 and 17. The flow of combustion exhaust gas described in FIG. 19 is obtained with reference to calculation results of the flow velocity of combustion exhaust gas. In FIG. 18, flowing directions in which combustion exhaust gas flows fast are described by the arrows. Namely, the arrows indicate sections and the flowing directions in which a large quantity of combustion exhaust gas flows. Regarding components having the same configuration, some of the components may be indicated by reference signs and others may not be indicated by the reference signs. The components same as those of the first embodiment are indicated by the same reference signs and may not be described.

A water heater 201 of the second embodiment includes the secondary heat exchanger 220. The secondary heat exchanger 220 includes an extending plate 232A instead of the guide plate 31 of the first embodiment. The extending plate 232A extends frontward from an end of the burring portion 30 that extends from a hole edge of a gas inlet 228. The extending plate 232A has an eaves-like shape. Namely, the extending plate 232A is not inclined downward to the inside of the case 22 as it extends frontward. The extending plate 232A extends frontward at the position close to a middle of the opening 53 of the flow path member 50 with respect to the upper-bottom direction. Namely, the upper hole edge of the gas inlet 228 is lower than the upper edge of the opening 53. The burring portion 30 that is behind the extending plate 232A extends from the upper hole edge of the gas inlet 228 that is lower than the upper edge of the opening 53.

As described above, the second embodiment differs from the first embodiment in that the upper hole edge of the gas inlet 228 is lower than the upper edge of the opening 53 in the vicinity of the extending plate 232A and the extending plate 232A is not inclined downwardly and extends frontward. When the combustion exhaust gas is introduced into the case 22 from the flow path member 50 through the gas inlet 228, drift of the combustion exhaust gas may occur in the upper section of the case 22 above the end of the gas flow cavity that is defined by the flow path member 50. However, with the extending plate 232A being provided, the combustion exhaust gas that is introduced into the case 22 through the gas inlet 228 is less likely to flow upward. Namely, in the second embodiment, the extending plate 232A functions as the flow restriction member. By providing the extending plate 232A, the combustion exhaust gas flows frontward and upward near the rearmost middle straight pipe portion 21AM and flows into the spaces between the heat transfer pipes 21. Therefore, the combustion exhaust gas flows to the section S5 adjacent to the straight pipe portions 21A that are at the rearmost and lower position. This improves thermal efficiency of the secondary heat exchanger 220 compared to the configuration described in FIG. 17.

The extending plate 232A can be formed more easily than the guide plate 31 of the first embodiment that requires adjustment of the inclination angle.

Other Embodiments

The technology described herein is not limited to the embodiments described above with reference to the drawings. For example, features of the embodiments described above or below can be combined as far as they are compatible. Any feature of the embodiments described above or below that is not explicitly stated as essential may be omitted. The above embodiments may be altered as following.

In the above embodiment, the gas outlet 41 of the secondary heat exchanger 20 opens upward; however, a gas outlet of a secondary heat exchanger may open frontward.

In the above embodiments, the water heater 1, 201 includes a water heater circuit for heating tap water and supplies hot water; however, a water heater may be used for a circulation system in a bathtub unit or a central heating system.

The technical scope of the present disclosure is not limited to the embodiment described above and may include all modifications in the scope of claim or its equivalent scope.

The invention claimed is:

1. A water heater, comprising:
a primary heat exchanger;
a secondary heat exchanger disposed above the primary heat exchanger, the secondary heat exchanger including
a case including a wall having a gas inlet through which combustion exhaust gas discharged from the primary heat exchanger introduced into the case, and
heat transfer pipes that are arranged in the case;
a flow path member connecting the primary heat exchanger and the secondary heat exchanger and disposed adjacent to the gas inlet, the flow path member configured to introduce the combustion exhaust gas discharged from the primary heat exchanger into the secondary heat exchanger through the gas inlet; and
a flow restriction member disposed on the wall of the case to suppress upward flowing of the combustion exhaust gas that is introduced into the case through the gas inlet;
wherein the flow restriction member is a guide plate that is integrally included in the case and extends from an upper hole edge of the gas inlet and is inclined downward as the guide plate extends toward an inside of the case.

2. The water heater according to claim 1, wherein
the heat transfer pipes are disposed on top of each other in a first direction in the case,
the heat transfer pipes include straight pipe portions that extend in a second direction that is perpendicular to the first direction and are arranged at intervals with respect to the first direction and a third direction that is perpendicular to the first direction and the second direction, and
the guide plate is inclined such that an imaginary plane surface extending from the guide plate crosses one of the straight pipe portions that is disposed closest to the gas inlet with respect to the third direction and lower than a middle of the straight pipe portions with respect to the first direction.

3. The water heater according to claim 1, wherein
the flow path member includes a recess portion having an opening that opens toward the gas inlet,
the flow path member is mounted on the wall to cover the gas inlet and the opening of the flow path member and the gas inlet is communicated with each other, and
the flow path member and the wall define an inner space between the flow path member and the wall and the combustion exhaust gas flows in the inner space.

4. The water heater according to claim 3, wherein
an upper hole edge of the opening and an upper hole edge of the gas inlet are at a same level, and
an upper wall of the flow path member extends to be inclined downward from the upper hole edge of the opening.

* * * * *